United States Patent
Satou

(10) Patent No.: US 11,664,920 B2
(45) Date of Patent: May 30, 2023

(54) OPTICAL TRANSMISSION APPARATUS, OPTICAL TRANSMISSION METHOD, AND PROGRAM

(71) Applicant: NEC Corporation, Tokyo (JP)

(72) Inventor: Yoshirou Satou, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/464,939

(22) Filed: Sep. 2, 2021

(65) Prior Publication Data

US 2022/0077947 A1   Mar. 10, 2022

(30) Foreign Application Priority Data

Sep. 9, 2020   (JP) .............................. JP2020-151470

(51) Int. Cl.
| | |
|---|---|
| *H04J 14/02* | (2006.01) |
| *H04B 10/294* | (2013.01) |
| *H04B 10/079* | (2013.01) |
| *H04B 10/032* | (2013.01) |

(52) U.S. Cl.
CPC ............ *H04J 14/02* (2013.01); *H04B 10/032* (2013.01); *H04B 10/079* (2013.01); *H04B 10/294* (2013.01)

(58) Field of Classification Search
CPC .... H04J 14/02; H04J 14/0297; H04J 14/0221; H04B 10/032; H04B 10/079; H04B 10/294
See application file for complete search history.

(56) References Cited

U.S. PATENT DOCUMENTS

| | | | | |
|---|---|---|---|---|
| 5,396,357 A | * | 3/1995 | Goossen ............. | H04J 14/0201 398/79 |
| 6,724,526 B1 | * | 4/2004 | Onaka ................ | H04J 14/0221 359/337.12 |
| 2003/0002776 A1 | * | 1/2003 | Graves ................ | H04J 14/0289 385/24 |

(Continued)

FOREIGN PATENT DOCUMENTS

| | | | | |
|---|---|---|---|---|
| CA | 2399525 C | * | 9/2010 | ......... H04B 7/18582 |
| JP | H06232820 A | * | 8/1994 | ........... H04B 10/803 |

(Continued)

*Primary Examiner* — Abbas H Alagheband
(74) *Attorney, Agent, or Firm* — Sughrue Mion, PLLC

(57) ABSTRACT

An optical transmission apparatus includes a multiplexing unit multiplexing signal light of a main signal, and dummy lights of odd channel and an even channel emitted using first and second dummy light sources, respectively, a detection unit detecting abnormality of the first and second dummy light sources, and a control unit performing addition control. The addition control includes control in such a way that dummy light of an even channel emitted using the first dummy light source is additionally multiplexed with the signal light, when no abnormality is found in the first dummy light source and an abnormality of the second dummy light source is detected, and that dummy light of an odd channel emitted using the second dummy light source is additionally multiplexed with the signal light, when no abnormality is found in the second dummy light source and an abnormality of the first dummy light source is detected.

17 Claims, 19 Drawing Sheets

(56) References Cited

U.S. PATENT DOCUMENTS

| | | | | |
|---|---|---|---|---|
| 2005/0213972 A1* | 9/2005 | Aoki | ................... | H04B 10/508 |
| | | | | 398/49 |
| 2007/0058986 A1* | 3/2007 | Butler | .................... | H04J 14/02 |
| | | | | 398/175 |
| 2012/0087658 A1* | 4/2012 | Jander | ............... | H04Q 11/0005 |
| | | | | 398/48 |

FOREIGN PATENT DOCUMENTS

| | | | | | |
|---|---|---|---|---|---|
| JP | 2006254154 | A | * | 9/2006 | |
| JP | 2007028461 | A | * | 2/2007 | |
| JP | 2006-141674 | A | | 6/2008 | |
| JP | 4522894 | B2 | * | 8/2010 | |
| WO | WO-2008122180 | A1 | * | 10/2008 | ........... H04B 10/296 |

* cited by examiner

OPTICAL TRANSMISSION APPARATUS, OPTICAL TRANSMISSION METHOD, AND PROGRAM

INCORPORATION BY REFERENCE

This application is based upon and claims the benefit of priority from Japanese patent application No. 2020-151470, filed on Sep. 9, 2020, the disclosure of which is incorporated herein in its entirety by reference.

TECHNICAL FIELD

The present disclosure relates to an optical transmission apparatus, an optical transmission method, and a program.

BACKGROUND ART

An optical transmission apparatus such as an optical wavelength multiplexing and demultiplexing apparatus disposed in a submarine cable system and the like is often equipped with one dummy light source for compensating total optical power in a used frequency band when no transponder signal light is inserted.

As a technique for responding a failure of a dummy light source, Japanese Unexamined Patent Application Publication No. 2008-141674, for example, discloses a wavelength multiplexing transmission apparatus having dummy light sources made redundant in order to improve reliability of the apparatus.

The apparatus disclosed in Japanese Unexamined Patent Application Publication No. 2008-141674 includes a plurality of signal light transmission units that output beams of signal light respectively having different center wavelengths, a dummy light output unit that outputs dummy light having a center wavelength different from those of the plurality of beams of signal light, an optical multiplexer, and an optical amplifier. The optical multiplexer multiplexes beams of the signal light output from the plurality of signal light transmission units and the dummy light output from the dummy light output unit, and the optical amplifier amplifies wavelength-multiplexed light from the optical multiplexer and sends the amplified light to an optical transmission path. The dummy light output unit includes a plurality of dummy light sources that output dummy light having wavelengths close to a center wavelength set in the dummy light output unit, an optical coupler that multiplexes beams of the dummy light output from the plurality of dummy light sources, and a dummy light source control unit. The dummy light source control unit measures an optical output level of the dummy light multiplexed by the optical coupler, and controls optical output levels of the plurality of dummy light sources in such a way as to adjust the measured optical output level to a predetermined value.

SUMMARY

To increase cost and design diversity in constructing an optical transmission system, in making dummy light sources redundant, a demand has arisen for a technique for allowing control by a scheme simpler than that used in the wavelength multiplexing transmission apparatus disclosed in Japanese Unexamined Patent Application Publication No. 2008-141674.

An object of the present disclosure is to solve such a problem, and thus provide an optical transmission apparatus, an optical transmission method, and a program that can make dummy light sources redundant with a configuration requiring only simple control.

An optical transmission apparatus according to a first aspect of the present disclosure includes a multiplexing unit configured to multiplex signal light of a main signal, dummy light of an odd channel emitted using a first dummy light source as a light source, and dummy light of an even channel emitted using a second dummy light source as a light source, a detection unit configured to detect an abnormality of the first dummy light source and an abnormality of the second dummy light source, and a control unit configured to perform addition control in such a way that dummy light of an even channel emitted using the first dummy light source as a light source is additionally multiplexed with signal light of the main signal by the multiplexing unit, when no abnormality is found in the first dummy light source and an abnormality of the second dummy light source is detected by the detection unit, and dummy light of an odd channel emitted using the second dummy light source as a light source is additionally multiplexed with signal light of the main signal by the multiplexing unit, when no abnormality is found in the second dummy light source and an abnormality of the first dummy light source is detected by the detection unit.

An optical transmission method according to a second aspect of the present disclosure includes multiplexing signal light of a main signal, dummy light of an odd channel emitted using a first dummy light source as a light source, and dummy light of an even channel emitted using a second dummy light source as a light source, detecting an abnormality of the first dummy light source and an abnormality of the second dummy light source, and performing addition control in such a way that dummy light of an even channel emitted using the first dummy light source as a light source is additionally multiplexed with signal light of the main signal in the multiplexing, when no abnormality is found in the first dummy light source and an abnormality of the second dummy light source is detected in the detecting, and dummy light of an odd channel emitted using the second dummy light source as a light source is additionally multiplexed with signal light of the main signal in the multiplexing, when no abnormality is found in the second dummy light source and an abnormality of the first dummy light source is detected in the detecting.

A program according to a third aspect of the present disclosure is a program for causing a computer, mounted in an optical transmission apparatus configured to multiplex signal light of a main signal, dummy light of an odd channel emitted using a first dummy light source as a light source, and dummy light of an even channel emitted using a second dummy light source as a light source, to execute detecting an abnormality of the first dummy light source and an abnormality of the second dummy light source, and performing addition control in such a way that dummy light of an even channel emitted using the first dummy light source as a light source is additionally multiplexed with signal light of the main signal, when no abnormality is found in the first dummy light source and an abnormality of the second dummy light source is detected in the detecting, and dummy light of an odd channel emitted using the second dummy light source as a light source is additionally multiplexed with signal light of the main signal, when no abnormality is found in the second dummy light source and an abnormality of the first dummy light source is detected in the detecting.

BRIEF DESCRIPTION OF DRAWINGS

The above and other aspects, features and advantages of the present disclosure will become more apparent from the following description of certain exemplary embodiments when taken in conjunction with the accompanying drawings, in which.

EXAMPLE EMBODIMENT

Example embodiments will be described below with reference to the drawings. Note that, in the example embodiments, the same reference sign denotes the same or equivalent components, and a repetitive description thereof may not be described. The drawings to be set forth below include drawings illustrating a unidirectional arrow, which clearly indicate a direction of flow of certain signal (data), and are not intended to exclude bidirectionality.

First Example Embodiment

Figure 1:
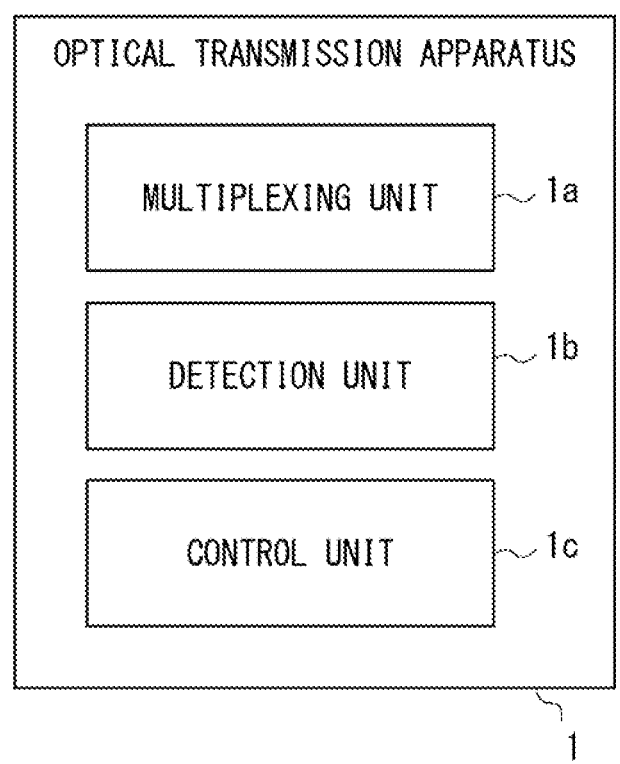
FIG. 1 is a block diagram illustrating one configuration example of an optical transmission apparatus according to a first example embodiment.

An optical transmission apparatus according to a first example embodiment will be described below with reference to FIG. 1. FIG. 1 is a block diagram illustrating one configuration example of the optical transmission apparatus according to the first example embodiment.

An optical transmission apparatus 1 according to the present example embodiment can include a multiplexing unit 1a, a detection unit 1b, and a control unit 1c, as illustrated in FIG. 1. The optical transmission apparatus 1 can be built into, for example, a submarine cable system and the like.

The multiplexing unit 1a multiplexes signal light of a main signal, dummy light of an odd channel emitted using a first dummy light source as a light source, and dummy light of an even channel emitted using a second dummy light source as a light source. Both of beams of the dummy light can be inserted in order to compensate intensity (optical output power) of optical output, for example, at all times or in response to presence or absence of signal light of a main signal. Inserting dummy light in response to presence or absence of signal light of a main signal can mean placing dummy light at a position where the dummy light overlaps with signal light of a main signal (wavelengths may be the same as or different from each other), and turning off the dummy light manually (by an administrator operation) or automatically when overlapping with the signal light. It suffices to employ a known technique as a scheme itself for inserting dummy light into signal light of a main signal.

The odd channel and the even channel can refer herein to an odd-numbered channel and an even-numbered channel, respectively, in a group of channels arranged in sequence according to a relationship in value of a frequency or a wavelength. The following description assumes that a relationship in value of a center frequency is used as the above-mentioned relationship in value, but relationships in value based on other criteria may be used, such as a relationship in value of a channel frequency band, a relationship in value of a channel center wavelength, or a relationship in value of a channel wavelength band. In arranging the channels in sequence, the channels can be arranged at a predetermined interval, based on, for example, a center frequency or a center wavelength, but the interval can also be varied as long as it can be considered not to allow an odd channel and an even channel adjacent to each other to interfere with each other.

Alternatively, it is also able to define that the odd channel is a channel having a predetermined digit number of a center wavelength or a center frequency that takes an odd value, and the even channel is a channel having the above-mentioned predetermined digit number that takes an even value. In this case, each of beams of dummy light of the odd channel and the even channel are implemented as beams of dummy light having an odd wavelength and an even wavelength, respectively, or beams of dummy light having an odd frequency and an even frequency, respectively. A value of the digit used in the definition can be implemented as a value acquired as a result of arithmetic processing such as round-off, round-up, or round-down, as a matter of course.

Note that, because of execution of the multiplexing as described above, the optical transmission apparatus 1 can be referred to as an optical wavelength multiplexing apparatus or an optical wavelength multiplexing transmission apparatus. The signal light of the main signal itself can even be implemented as a plurality of beams of signal light respectively having different center wavelengths (respectively having different center frequencies), that is, the main signal can be implemented as a wavelength-multiplexed optical signal, as a matter of course. The optical transmission apparatus 1 can also be configured as an optical wavelength multiplexing and demultiplexing apparatus.

The detection unit 1b detects an abnormality of the first dummy light source and an abnormality of the second dummy light source. The control unit 1c performs the following addition control. The above-mentioned addition control is implemented as control performed in such a way that dummy light of an even channel emitted using the first dummy light source as a light source is additionally multiplexed with the signal light of the main signal by the multiplexing unit 1a, when no abnormality is found in the first dummy light source and an abnormality of the second dummy light source is detected by the detection unit 1b. The above-mentioned addition control is further implemented as control performed in such a way that dummy light of an odd channel emitted using the second dummy light source as a light source is additionally multiplexed with the signal light of the main signal by the multiplexing unit 1a, when no abnormality is found in the second dummy light source and an abnormality of the first dummy light source is detected by the detection unit 1b. The above-mentioned addition control can also be referred to as channel addition control.

In other words, in the present example embodiment, an abnormality of both of the first and second dummy light sources serving as light sources for each of beams of dummy light of odd and even channels is detected, and when either dummy light source is detected to have an abnormality, a channel emitted using the detected dummy light source as a light source is output using the other dummy light source as a light source.

Note that, the control unit 1c can be achieved by, for example, a central processing unit (CPU), a working memory, a nonvolatile storage device storing a program for controlling the overall optical transmission apparatus 1, and the like. In other words, the control unit 1c can include a control computer on which a program for the above-mentioned addition control is embedded to be executable. The control unit 1c can even be achieved in a configuration including, for example, an integrated circuit (IC).

Figure 2:
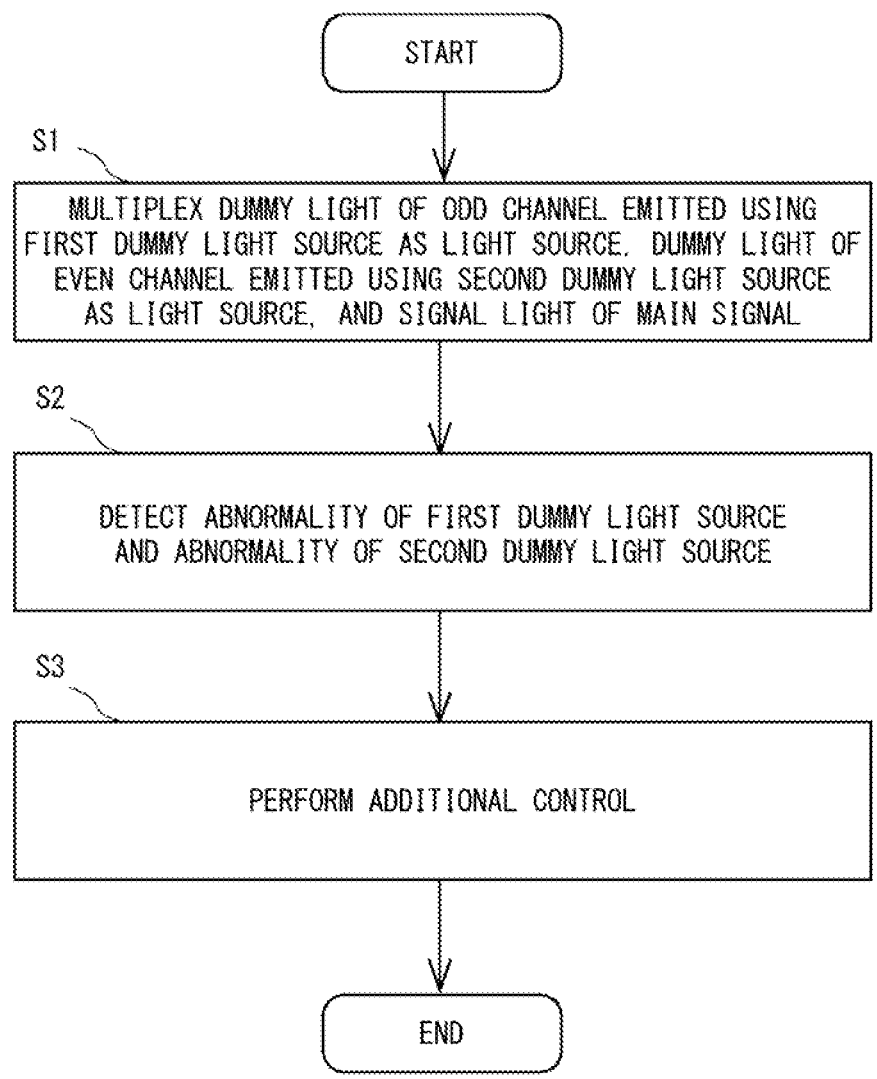
FIG. 2 is a flowchart for describing one example of an optical transmission method in the optical transmission apparatus illustrated in FIG. 1.

One example of an optical transmission method including the addition control as described above will be described below with reference to FIG. 2. FIG. 2 is a flowchart for describing one example of an optical transmission method in the optical transmission apparatus 1.

In the optical transmission method herein, the optical transmission apparatus 1 multiplexes signal light of a main signal, dummy light of an odd channel emitted using a first dummy light source as a light source, and dummy light of an even channel emitted using a second dummy light source as a light source (step S1). Note that, signal light of a main signal may be practically absent in the multiplexing of step S1, and at least one of dummy light of an odd channel and dummy light of an even channel may be absent, as is also obvious from the fact that detection in step S2 is performed.

In a state of step S1, the optical transmission apparatus 1 detects an abnormality of the first dummy light source and an abnormality of the second dummy light source (step S2). Thus, the optical transmission apparatus 1 performs the following addition control (step S3).

The above-mentioned addition control is implemented as control performed in such a way that dummy light of an even channel emitted using the first dummy light source as a light source is additionally multiplexed with the signal light of the main signal in step S1, when no abnormality is found in the first dummy light source and an abnormality of the second dummy light source is detected in step S2. The above-mentioned addition control is further implemented as control performed in such a way that dummy light of an odd channel emitted using the second dummy light source as a light source is additionally multiplexed with the signal light of the main signal in step S1, when no abnormality is found in the second dummy light source and an abnormality of the first dummy light source is detected in step S2.

Note that, step S1, step S2, and step S3 can be referred to as a multiplexing step, a detection step, and a control step, respectively, and can be executed by the multiplexing unit 1a, the detection unit 1b, and the control unit 1c, respectively. The above-mentioned program can be interpreted as a program for causing a computer to execute the above-mentioned detection step and the above-mentioned control step. The "computer" refers herein to a computer mounted in an optical transmission apparatus that multiplexes signal light of a main signal, dummy light of an odd channel emitted using a first dummy light source as a light source, and dummy light of an even channel emitted using a second dummy light source as a light source.

By the addition control as described above, in a state in which dummy light from the first dummy light source and dummy light from the second dummy light source are multiplexed, even when an abnormality occurs in one dummy light source, the following multiplexing can be performed. That is, dummy light having a wavelength that has been multiplexed using the above-mentioned one dummy light source as a light source can be multiplexed using the other dummy light source as a light source. Hence, according to the present example embodiment, it is possible not only to make dummy light sources redundant with a simple structure, but also to be such a redundant configuration as a configuration requiring only simple control.

Second Example Embodiment

Figure 3:
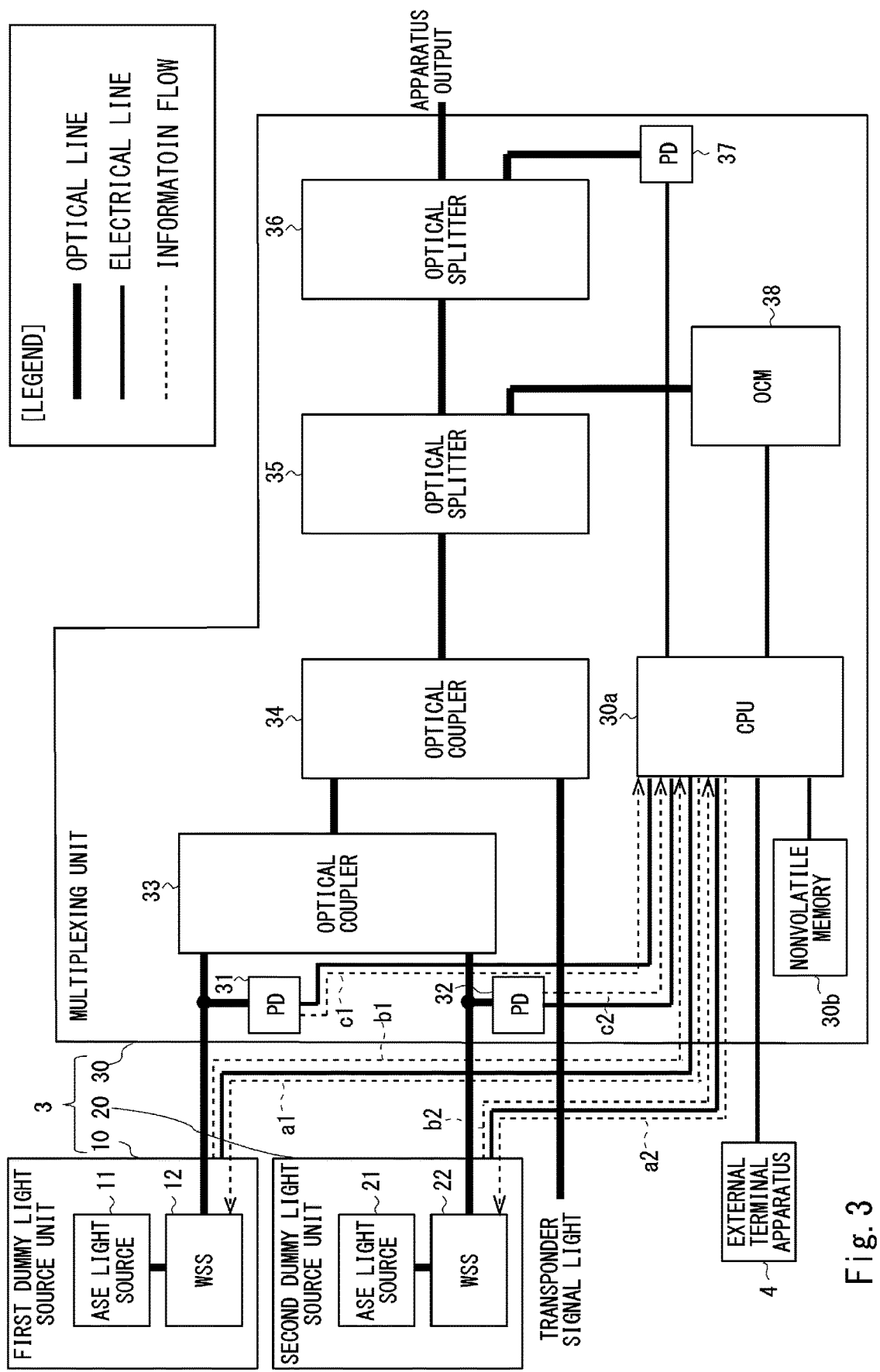
FIG. 3 is a block diagram illustrating one configuration example of an optical wavelength multiplexing transmission apparatus according to a second example embodiment.

A second example embodiment will be described below with reference to FIGS. 3 to 17 together, while focusing on differences from the first example embodiment, but various examples as described in the first example embodiment are applicable. FIG. 3 is a block diagram illustrating one configuration example of an optical wavelength multiplexing transmission apparatus according to the second example embodiment. Note that, boldest lines connecting components to each other in FIG. 3 indicate optical communication lines formed by optical fiber core wires or the like.

An optical wavelength multiplexing transmission apparatus 3 according to the present example embodiment can include a first dummy light source unit 10, a second dummy light source unit 20, and a multiplexing unit 30, and can be connected to an external monitor and control apparatus (external terminal apparatus) 4 by an electric wire or an optical communication line, as illustrated in FIG. 3. The optical wavelength multiplexing transmission apparatus 3 can also be designed as an apparatus that inputs, as signal light of a main signal, transponder signal light compatible with, for example, optical digital coherent communication, and outputs the input light to a subsequent stage. The transponder signal light can be implemented by multiplexing beams of signal light having a maximum number of wavelengths designed from zero wave.

The first dummy light source unit 10 can include an amplified spontaneous emission (ASE) light source 11 and a wavelength selective switch (WSS) 12. The ASE light source 11 serves as a light source that generates dummy light, and can be designed as a light source that emits, at high level, ASE light uniformly over the entire used frequency band. Natural light (ASE light) is used as the dummy light in the present example embodiment in order to stabilize a polarization state of the transponder signal light compatible with optical digital coherent communication. The dummy light, however, is not limited to such natural light.

The dummy light can be inserted in order to compensate intensity (optical output power) of optical output, for example, in response to presence or absence of signal light of a main signal. To insert the dummy light in place of the transponder signal light, it is a common practice to make ASE light appear as if it were a plurality of beams of wavelength light (dummy light channels). Therefore, the WSS 12 performs division control and optical power control for the ASE light output from the ASE light source 11.

The WSS 12 is placed downstream of the ASE light source 11, and can adjust the optical output power by turning on and off a cut waveform (a waveform acquired by division control) as the above-mentioned optical power control. Preferably, for example, the optical output power of the dummy light is initially adjusted in advance using, as a target, the optical output power when all beams of the signal light of the main signal are inserted, and then the dummy light is turned off when the signal light of the main signal is inserted, and the dummy light is turned on when the signal light of the main signal is not inserted. Note that, complementing can relatively easily be performed when the signal light of the main signal and the dummy light (each of beams of dummy light output from the WSS 12 and a WSS 22 to be described later) have a one-to-one correspondence. However, even an arrangement in which the dummy light does not overlap with the signal light of the main signal when the signal light is inserted causes only a small error with respect to the optical output power as a whole, and therefore poses no serious problem in terms of operation. The above-mentioned arrangement can be implemented as an arrangement in which, for example, a plurality of waves are kept OFF in such a way that the wavelength of the dummy light is shifted from that of the signal light and does not overlap with the signal light.

The first dummy light source unit 10 is one example of the first dummy light source, and outputs dummy light having an odd frequency (odd channel). In this example, the WSS 12 is configured to select and output dummy light of an odd channel for the ASE light output from the ASE light source 11.

In the WSS 12, for example, a waveform of the dummy light channel to be output can be set to have, for example, a center frequency interval of 50 GHz and a bandwidth of 50 GHz, and an amount of output power attenuation can also be set. Based on the setting, setting can further be performed automatically or by an additional manual operation in such a way as to output dummy light exhibiting a waveform having an odd frequency as a center frequency (dummy light of an odd channel) from the WSS 12.

The second dummy light source unit 20 can include an ASE light source 21 and a WSS 22. The ASE light source 21 serves as a light source that generates dummy light, and can be designed as a light source that emits, at high level, ASE light uniformly over the entire used frequency band, similarly to the ASE light source 11. The WSS 22 performs division control and optical power control for the ASE light output from the ASE light source 21, similarly the WSS 12.

The second dummy light source unit 20 is one example of the second dummy light source, and outputs dummy light having an even frequency (even channel). In this example, the WSS 22 is configured to select and output dummy light of an even channel for the ASE light output from the ASE light source 21.

In the WSS 22, for example, a waveform of the dummy light channel to be output can be set to have, for example, a center frequency interval of 50 GHz and a bandwidth of 50 GHz, and an amount of output power attenuation can also be set. Based on the setting, setting can further be performed automatically or by an additional manual operation in such a way as to output dummy light exhibiting a waveform having an even frequency as a center frequency (dummy light of an even channel) from the WSS 22. Note that, in this manner, the center frequency interval and the bandwidth of the waveform, and the amount of output power attenuation set in the WSS 22 are preferably set the same as in the WSS 12. In particular, the optical wavelength multiplexing transmission apparatus 3 can employ a configuration that allows, when setting is performed in one WSS, the same values as in the one WSS to be set in the other WSS.

The multiplexing unit 30 is one example of the multiplexing unit 1a, and multiplexes the transponder signal light, the dummy light input from the first dummy light source unit 10, and the dummy light input from the second dummy light source unit 20. For the multiplexing, the multiplexing unit 30 can include optical couplers 33 and 34.

The optical coupler 33 multiplexes dummy light from the first dummy light source unit 10 and dummy light from the second dummy light source unit 20, that is, multiplexes dummy light channels from both of dummy light source units. The optical coupler 34 multiplexes the transponder signal light and the light (dummy light channel) input from the optical coupler 33. Note that, in order to briefly describe a scene in which the dummy light is required, the following description assumes that zero wave is used as the transponder signal light.

In this manner, the present example embodiment adopts the following redundant structure for dummy light sources. That is, the redundant structure is implemented as a structure that uses dummy light sources arranged in parallel in such a way as to alternately output an odd channel from one dummy light source (first dummy light source unit 10) and an even channel from the other dummy light source (second dummy light source unit 20) and multiplex the channels by the optical coupler 34.

The multiplexing unit 30 can further include photodiodes (PDs) 31 and 32 as one example of a part of the detection unit 1b, and a CPU 30a and a nonvolatile memory 30b as one example of the remaining function of the detection unit 1b and one example of the control unit 1c.

The PD 31 is one example of a photodetector that detects power of light input from the WSS 12 of the first dummy light source unit 10, and outputs a detection result to the CPU 30a. The PD 32 is one example of a photodetector that detects power of light input from the WSS 22 of the second dummy light source unit 20, and outputs a detection result to the CPU 30a. The PDs 31 and 32 each can, for example, be implemented as circuits that monitor input interruption (input power interruption) for light input from the WSSs 12 and 22, respectively. The CPU 30a controls the overall optical wavelength multiplexing transmission apparatus 3. The nonvolatile memory 30b can be implemented as a memory that stores various types of setting information and the like for performing various types of control in the CPU 30a.

The CPU 30a can detect an abnormality of the first dummy light source unit 10 by detecting, based on the output from the PD 31, an abnormality of dummy light of an odd channel input from the first dummy light source unit 10. The CPU 30a can, for example, detect an abnormality of the first dummy light source unit 10 by detecting, based on a monitoring result acquired from the PD 31, input interruption of the dummy light from the first dummy light source unit 10.

Similarly, the CPU 30a can detect an abnormality of the second dummy light source unit 20 by detecting, based on the output from the PD 32, an abnormality of dummy light of an even channel input from the second dummy light source unit 20. The CPU 30a can, for example, detect an abnormality of the second dummy light source unit 20 by detecting, based on a monitoring result acquired from the PD 32, input interruption of the dummy light from the second dummy light source unit 20.

The CPU 30a performs the following control as addition control (that can also be referred to as channel addition control or frequency addition control) when no abnormality is found in the first dummy light source unit 10 and an abnormality of the second dummy light source unit 20 is detected, based on the outputs from the PDs 31 and 32. In this case, the CPU 30a controls the first dummy light source unit 10 in such a way as to additionally output dummy light of an even channel. The WSS 12 can be used as a controlled object in this case.

In this manner, in the present example embodiment, even when a failure occurs in the second dummy light source unit 20 and then outputting the even channel is stopped, an amount of total optical power attenuation is as small as a half because the odd channel of the first dummy light source unit 10 remains. In the present example embodiment, furthermore, total optical power can be automatically restored by immediately emitting an even channel from the first dummy light source unit 10 in such a case.

The CPU 30a further performs the following control as another addition control when no abnormality is found in the second dummy light source unit 20 and an abnormality of the first dummy light source unit 10 is detected, based on the outputs from the PDs 31 and 32. In this case, the CPU 30a controls the second dummy light source unit 20 in such a way as to additionally output dummy light of an odd channel. The WSS 22 can be used as a controlled object in this case.

In this manner, in the present example embodiment, even when a failure occurs in the first dummy light source unit 10 and then outputting the odd channel is stopped, the amount of total optical power attenuation is as small as a half because the even channel of the second dummy light source unit 20 remains. In the present example embodiment, furthermore, the total optical power can be automatically restored by immediately emitting an odd channel from the second dummy light source unit 20 in such a case.

As described above, when an abnormality is detected in either one of the first dummy light source unit 10 and the second dummy light source unit 20, the CPU 30a causes the dummy light source unit being not detected to have any abnormality to additionally output dummy light of the channel of the dummy light source unit being detected to have an abnormality. In the present example embodiment, by such control, even at the time of an abnormality of either dummy light source, since the amount of total optical power attenuation is as small as a half and the amount of attenuation can be immediately restored to the original amount of attenuation, influence that the abnormality of the dummy light source exerts on the transponder signal can be suppressed as much as possible.

The CPU 30a can perform return control for making a return to a state before execution of the above-mentioned addition control, when either one of the first dummy light source unit 10 and the second dummy light source unit 20 being detected to have an abnormality is replaced after the above-mentioned addition control. The CPU 30a can, for example, perform, as the return control, control for causing the non-replaced dummy light source unit to stop outputting dummy light having a target wavelength added in control for adding the dummy light. Note that, the above-mentioned dummy light having the added target wavelength can be referred to as dummy light having an added target frequency or dummy light having an added target channel.

The WSSs 12 and 22 can include a function for adjusting the optical output power during the above-mentioned addition control and/or the above-mentioned return control. The adjustment can be performed by control from the CPU 30a, while referring to various setting values recorded in the nonvolatile memory 30b or various setting values set in the WSSs 12 and 22, in such a way as to maintain the total optical output power of the dummy light.

In this manner, the above-mentioned addition control can include control for performing adjustment in such a way as to compensate for an optical output power by dummy light of a channel being detected to have an abnormality by the optical output power of dummy light of a channel added to the signal light of the main signal. The adjustment refers to adjustment for a target dummy light source between the first dummy light source unit 10 and the second dummy light source unit 20. The above-mentioned return control can include control for performing similar adjustment. A specific example of such adjustment of the optical output power will be described as included in a processing example to be described later.

The optical wavelength multiplexing transmission apparatus 3 can include an optical splitter 35 and an OCM 38, in order to, for example, acquire information as a source for various types of control including the adjustment of the optical output power of dummy light as described above, and the like, and can further include an optical splitter 36 and a PD 37. Note that, "OCM" is an abbreviation for "optical channel monitor."

The optical splitter 35 serves as a splitter connected to the optical coupler 34 that multiplexes signal light of a main signal and dummy light, and used to branch the multiplexed light to a main path (on an apparatus output side) and a monitor path (on the side of the OCM 38). The OCM 38 serves as a monitor circuit that monitors the multiplexed light branched by the optical splitter 35, and is exemplified herein as a circuit that measures a correlation between a frequency and optical power in the used frequency band. The optical splitter 36 serves as a splitter connected to the optical splitter 35, and used to branch the multiplexed light in the main path to the main path and a monitor path (on the side of the PD 37). The PD 37 serves as a circuit that is connected to the optical splitter 36 and monitors output power of light serving as apparatus output, and outputs a monitoring result to the CPU 30a.

The CPU 30a can perform control of output of beams of dummy light from the WSS 12 of the first dummy light source unit 10 and the WSS 22 of the second dummy light source unit 20, in cooperation with the nonvolatile memory 30b, based on the outputs from the OCM 38 and the PD 37, and the like. The control can include control at the time of an abnormality (at the time of a failure) and control at the time of restoration.

As is also obvious from a processing example to be described later, the CPU 30a specifically performs the following control. The CPU 30a, for example, performs execution of an instruction (control command) issued from the external terminal apparatus 4, and notification to the external terminal apparatus 4 regarding the completion of internal control of the optical wavelength multiplexing transmission apparatus 3 or an apparatus failure. The CPU 30a further performs acquisition of information from the first dummy light source unit 10, the second dummy light source unit 20, the OCM 38, and the PDs 31, 32, and 37, control for the first dummy light source unit 10 and the second dummy light source unit 20, information transfer to the nonvolatile memory 30b, and the like. The nonvolatile memory 30b performs recording control information for the first dummy light source unit 10 and the second dummy light source unit 20, and recording information concerning the dummy light channel and the optical power measurement result (the measurement result by the OCM 38).

A processing example in the optical wavelength multiplexing transmission apparatus 3 will be described below.

One example of processing for adjusting the first dummy light source unit 10 and the second dummy light source unit 20 by setting dummy light in the optical wavelength multiplexing transmission apparatus 3 by the external terminal apparatus 4 will be described first with reference to FIGS. 4 to 9.

The following description first assumes that the optical wavelength multiplexing transmission apparatus 3 can be configured to set dummy light, and an administrator of the optical wavelength multiplexing transmission apparatus 3, that is, a user of the external terminal apparatus 4 performs a setting operation from the external terminal apparatus 4 in this case. The external terminal apparatus 4 can be implemented as a general-purpose computer or a dedicated control apparatus connected to the CPU 30a of the optical wavelength multiplexing transmission apparatus 3 by an optical communication line (or an electric wire) via a not-illustrated interface. The external terminal apparatus 4, however, can also be implemented as an operation unit such as a setting switch mounted in, for example, the optical wavelength multiplexing transmission apparatus 3. When the optical wavelength multiplexing transmission apparatus 3 is installed in an environment under which it can hardly be operated, for example, such as a sea floor, the external terminal apparatus 4 is required even in the presence of such an operation unit as well, as a matter of course.

Figure 4:
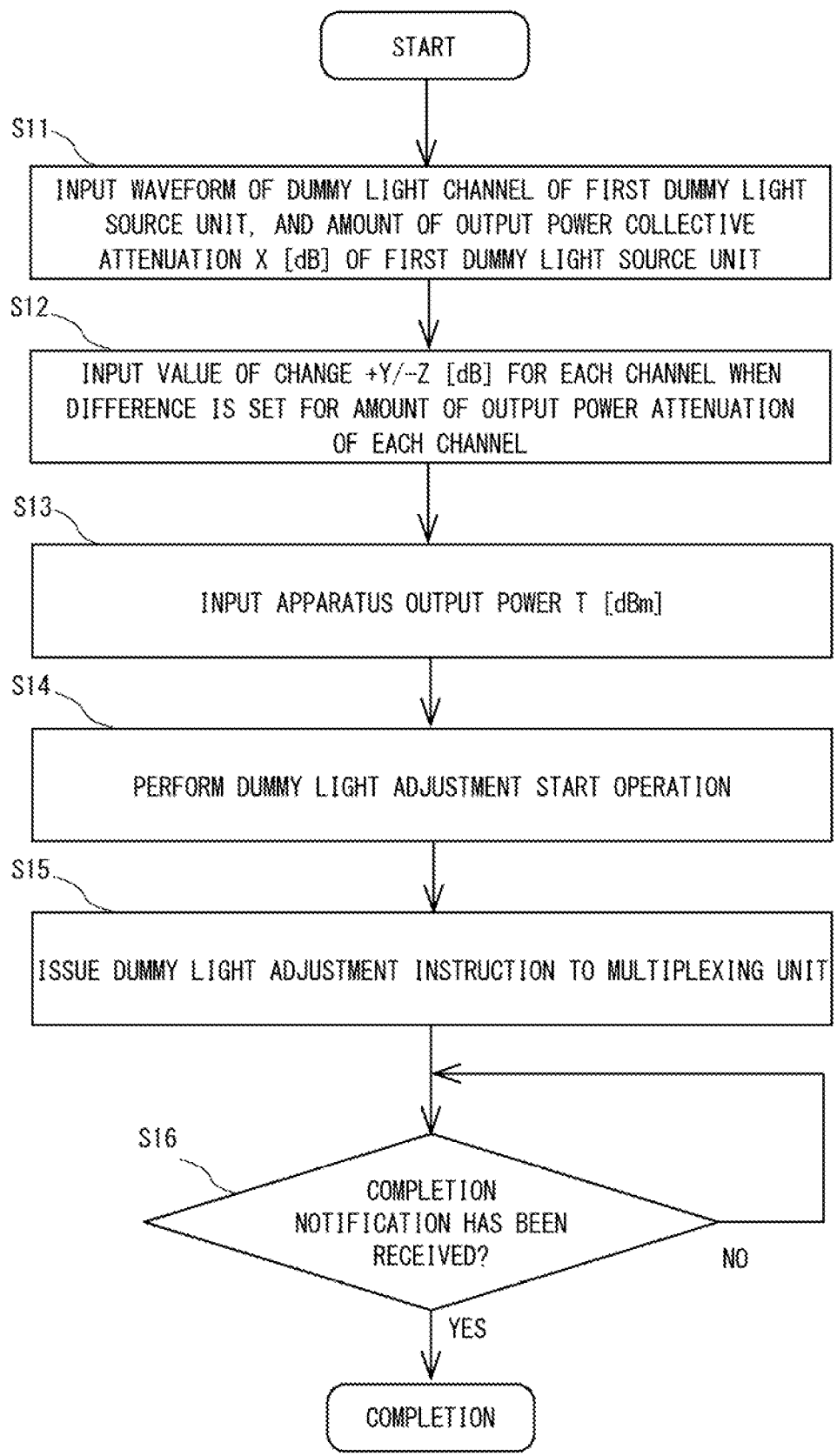
FIG. 4 is a flowchart for describing one example of setting processing of dummy light from an external monitor and control apparatus for the optical wavelength multiplexing transmission apparatus illustrated in FIG. 3.

Although the configuration example of the external terminal apparatus 4 is not illustrated, the external terminal apparatus 4 can include a control unit that controls the overall apparatus, an operation unit that accepts a user operation, and a communication unit that communicates with the optical wavelength multiplexing transmission apparatus 3, and can perform setting by setting processing as illustrated in FIG. 4. FIG. 4 is a flowchart for describing one example of setting processing of dummy light from the external terminal apparatus 4 for the optical wavelength multiplexing transmission apparatus 3.

A user first inputs, from the operation unit of the external terminal apparatus 4, a waveform of a dummy light channel of dummy light to be output from the first dummy light source unit 10, and a setting value X [dB] for an amount of output power collective attenuation as a common value for an amount of output power attenuation of each channel of the dummy light (step S11). The above-mentioned waveform can be input as, for example, a center frequency interval of 50 GHz and a bandwidth of 50 GHz.

A user further inputs an amount (value of change) of output power adjustment of each channel +Y/−Z (+ represents a decrease in power, and − represents an increase in power) [dB] from the operation unit when a difference is set for the amount of output power attenuation of each channel of the dummy light in the first dummy light source unit 10 (step S12). This makes it possible to set the amount of output power attenuation for each channel as a value of X+Y [dB] or X−Z [dB]. A user further inputs a setting value T [dBm] for apparatus output power of the optical wavelength multiplexing transmission apparatus 3 from the operation unit (step S13). Note that, an order of steps S11 to S13 may be freely determined. Note also that a description is given herein by taking an example in which the setting value for the first dummy light source unit 10 is used for the second dummy light source unit 20 as well.

A user then performs a dummy light adjustment start operation (or, an operation for determining various input setting values, and the like) from the operation unit in the external terminal apparatus 4 (step S14). In response to the operation, in the external terminal apparatus 4, the control unit transmits a dummy light adjustment instruction to the CPU 30a of the optical wavelength multiplexing transmission apparatus 3 via the communication unit (step S15). The dummy light adjustment instruction is assumed to include information indicating the various setting values input in steps S11 to S13. Such various setting values can also be transmitted every time when the values are input, as a matter of course.

After that, the external terminal apparatus 4 waits for a completion notification of dummy light adjustment processing (processing illustrated in FIGS. 5 to 8) transmitted from the optical wavelength multiplexing transmission apparatus 3 (from the CPU 30a) (step S16), and the setting processing is completed when the external terminal apparatus 4 receives the completion notification via the communication unit (when YES is determined).

Figure 5:
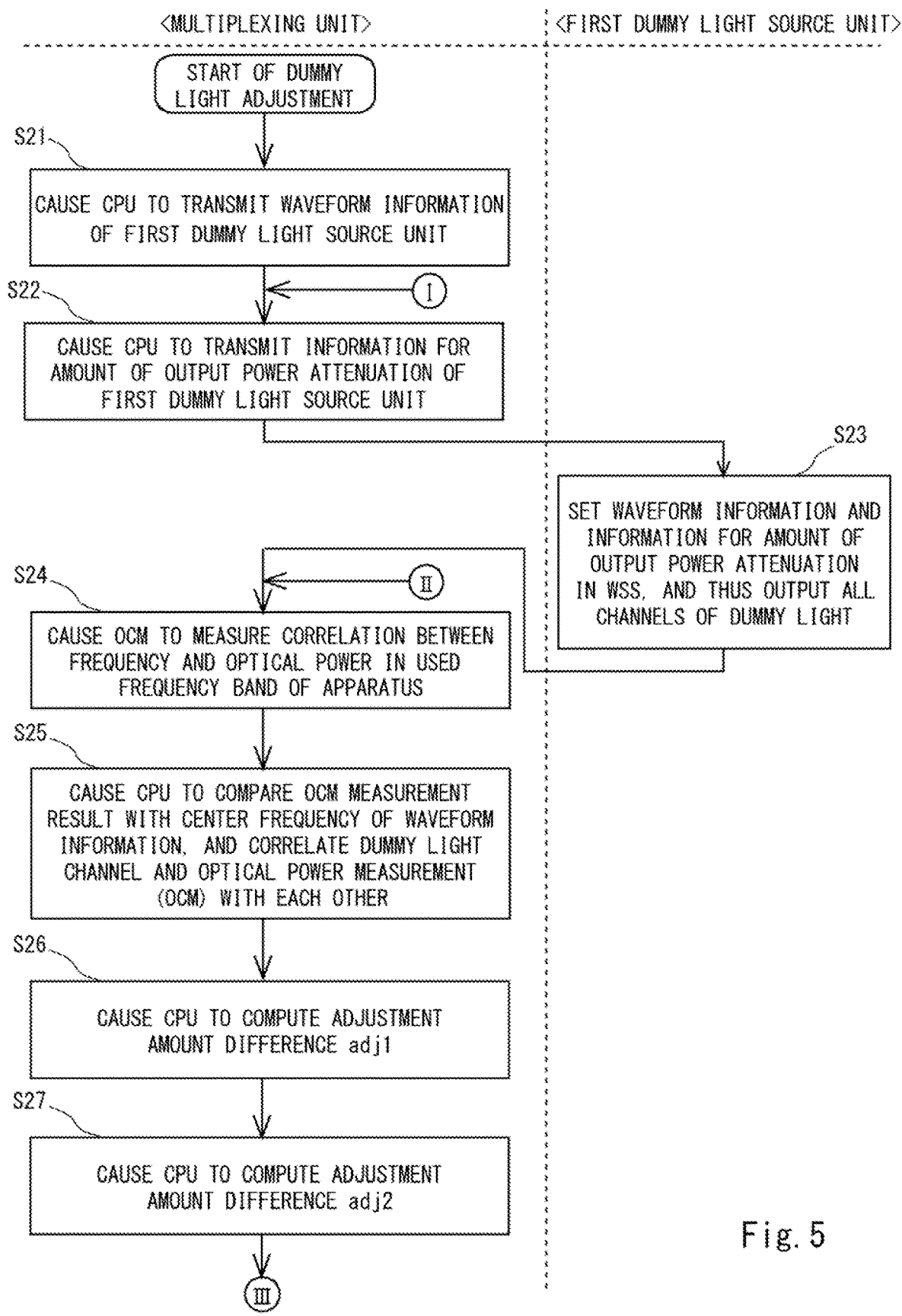
FIG. 5 is a flowchart for describing one example of dummy light adjustment processing in the optical wavelength multiplexing transmission apparatus illustrated in FIG. 3.
Figure 6:
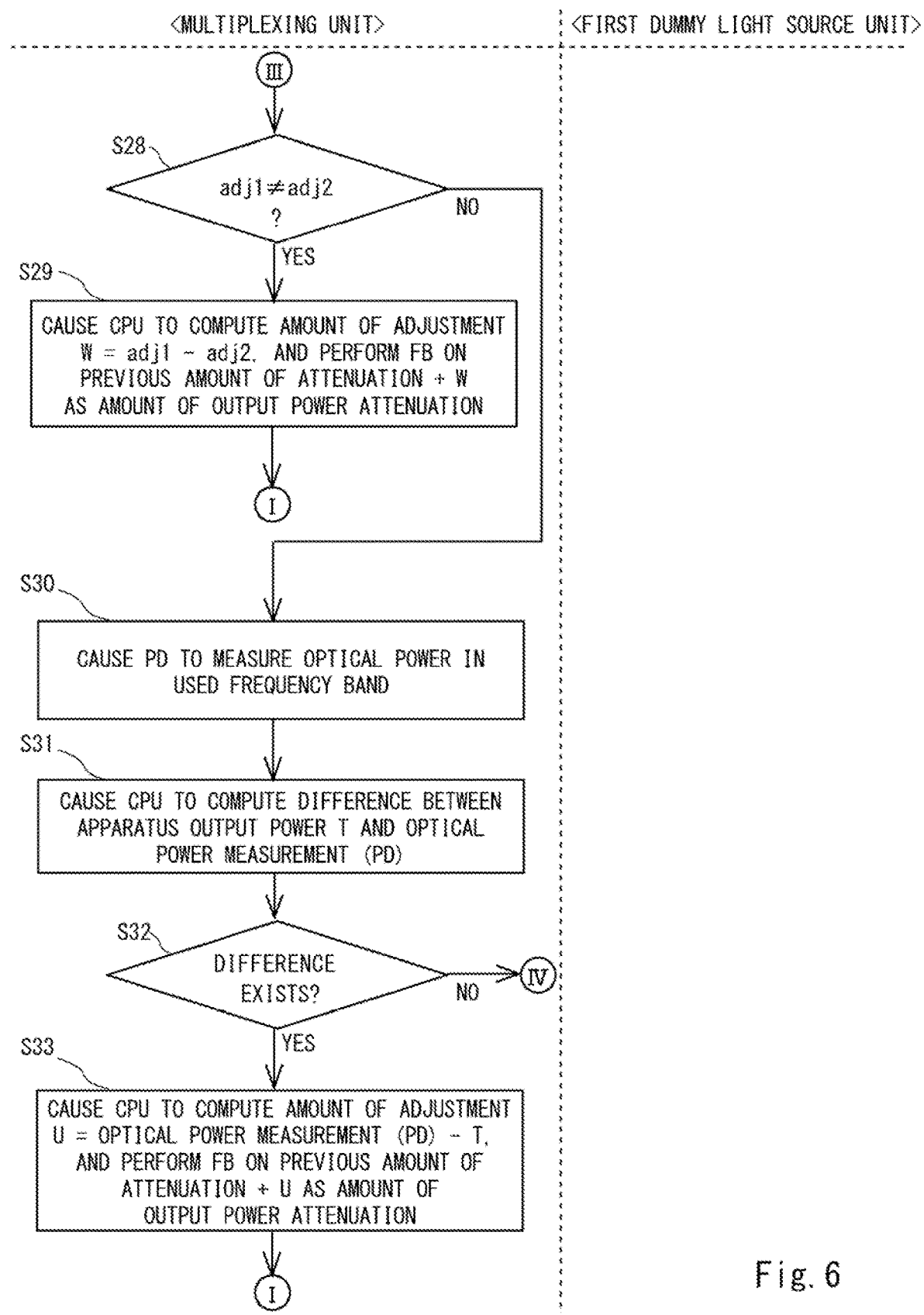
FIG. 6 is a flowchart continued from FIG. 5.
Figure 7:
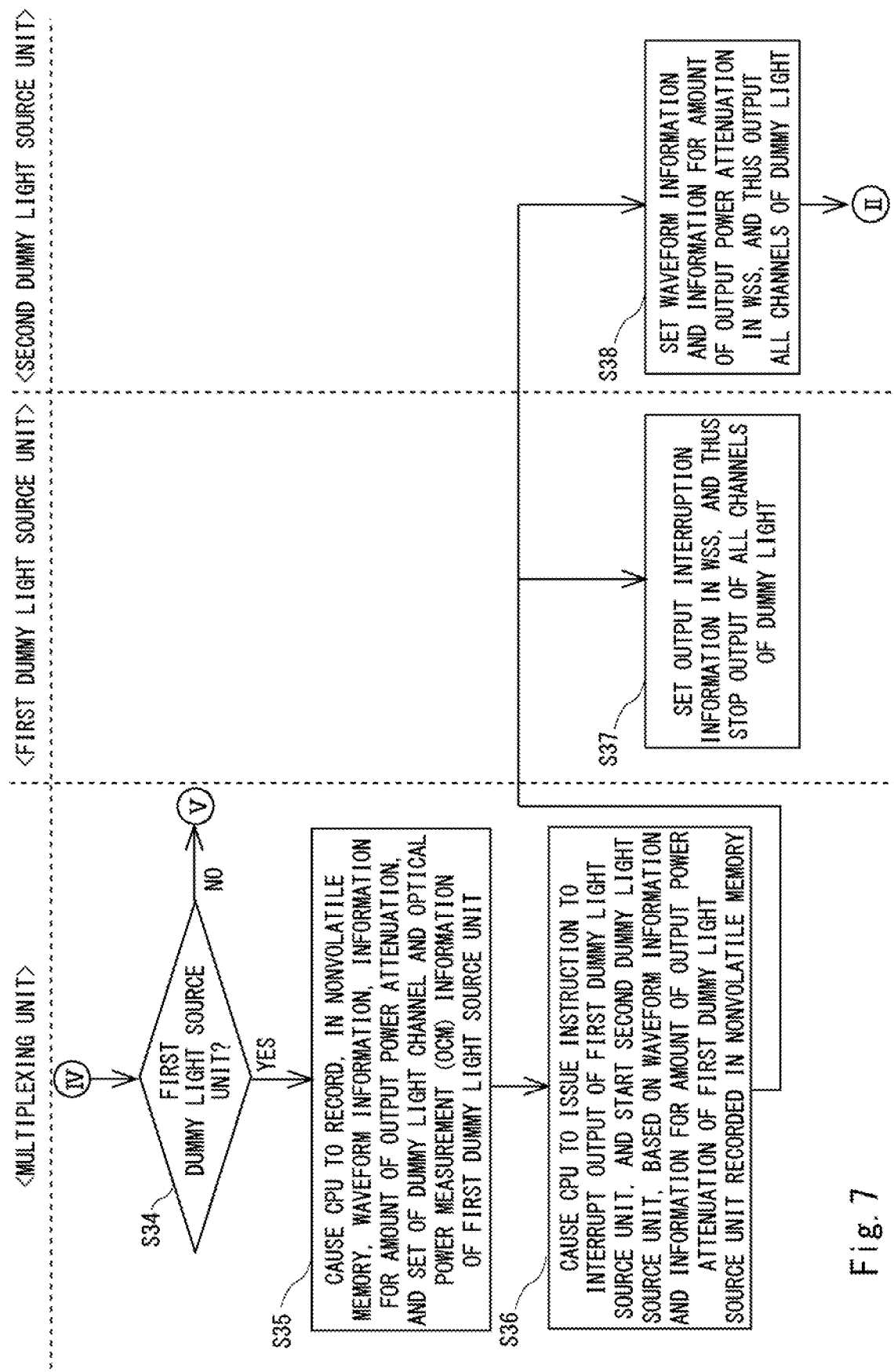
FIG. 7 is a flowchart continued from FIG. 6.
Figure 8:
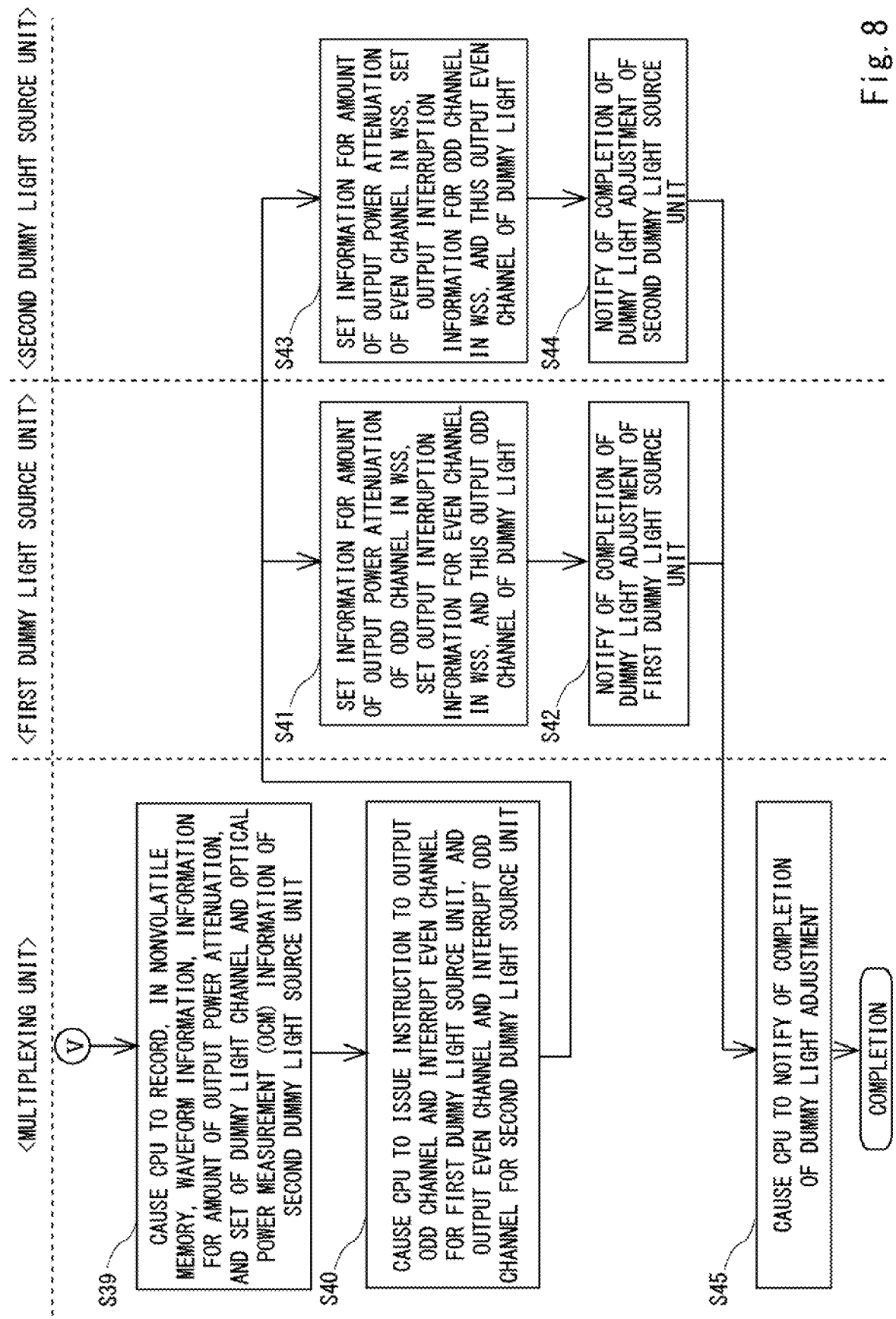
FIG. 8 is a flowchart continued from FIG. 7.
Figure 9:
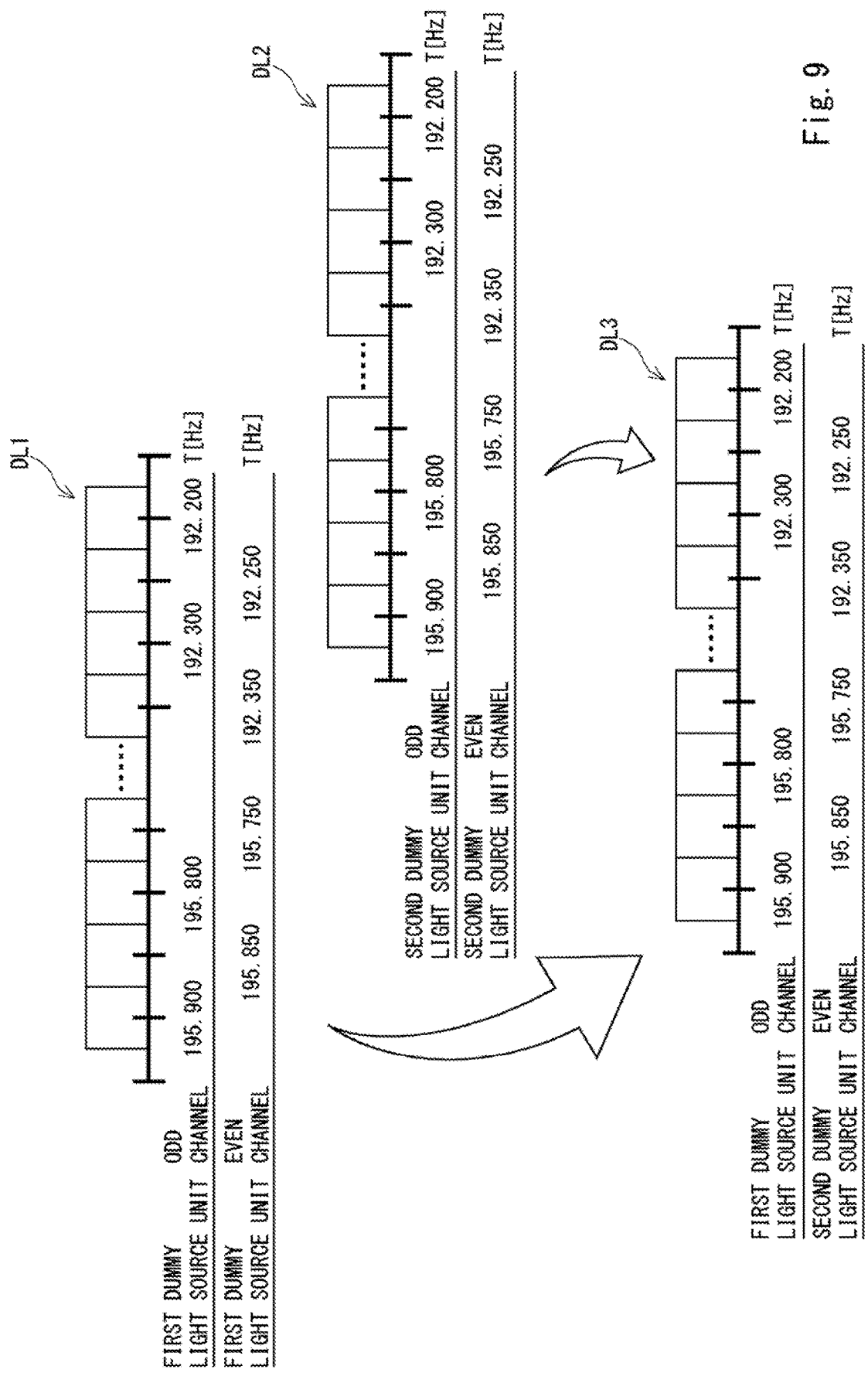
FIG. 9 is a schematic diagram illustrating a transition example of an optical signal arrangement of dummy light adjusted by the dummy light adjustment processing illustrated in FIGS. 5 to 8.

An example of the dummy light adjustment processing on the side of the optical wavelength multiplexing transmission apparatus 3 will be described below with reference to FIGS. 5 to 9. FIG. 5 is a flowchart for describing one example of dummy light adjustment processing in the optical wavelength multiplexing transmission apparatus 3, FIG. 6 is a flowchart continued from FIG. 5, FIG. 7 is a flowchart continued from FIG. 6, and FIG. 8 is a flowchart continued from FIG. 7. FIG. 9 is a schematic diagram illustrating a transition example of an optical signal arrangement of dummy light adjusted by the dummy light adjustment processing illustrated in FIGS. 5 to 8.

The optical wavelength multiplexing transmission apparatus 3 starts the dummy light adjustment processing when receiving the adjustment instruction in step S15. In the multiplexing unit 30, first, the CPU 30a transmits, to the WSS 12, information (waveform information) indicating the waveform of dummy light to be output from the first dummy light source unit 10 included in the adjustment instruction (step S21). The CPU 30a further transmits, to the WSS 12, information (information for the amount of output power attenuation) indicating the amount of output power attenuation of the dummy light to be output from the first dummy light source unit 10 included in the adjustment instruction (step S22). Note that, a transmission path in steps S21 and S22 is represented as a path a1 in FIG. 3.

Upon receiving the pieces of information transmitted in steps S21 and S22, the first dummy light source unit 10 sets the waveform information and the information for the amount of output power attenuation in the WSS 12, and thus outputs all channels of dummy light, as illustrated as dummy light DL1 in FIG. 9 (step S23). In other words, as illustrated as the dummy light DL1, in this stage, not only dummy light of odd channels but also dummy light of even channels is output, and a test of dummy light compensation processing (recovery processing) at the time of an abnormality can thus be conducted simultaneously.

In the multiplexing unit 30, the OCM 38 measures a correlation between a frequency and an optical power in the used frequency band of the optical wavelength multiplexing transmission apparatus 3 (step S24). The CPU 30a compares an OCM measurement result with a center frequency indicated by the waveform information stored in the nonvolatile memory 30b, and correlates the dummy light channel and the measured optical power measurement value (OCM measurement value) with each other (step S25).

The CPU 30a computes an adjustment amount difference (hereinafter, referred to as an adjustment amount difference adj1) with reference to a channel exhibiting a maximum power in the amount of output power adjustment of the dummy light channel (the setting value in the external terminal apparatus 4) (step S26). The CPU 30a further computes an adjustment amount difference (hereinafter, referred to as an adjustment amount difference adj2) with reference to the optical power measurement value (OCM measurement value) of the above-mentioned reference channel (step S27).

The CPU 30a compares the adjustment amount differences adj1 and adj2 with each other, and determines whether both are different from each other (step S28). When the adjustment amount differences are different from each other (YES in step S28), the CPU 30a computes an amount of adjustment W (=adj1−adj2), and performs feedback (FB) on a previous amount of attenuation+W as an amount of output power attenuation (step S29). The FB can be performed by returning the process to step S22, that is, by causing the CPU 30a to transmit the amount of output power attenuation incremented by +W to the WSS 12 of the first dummy light source unit 10 (to the WSS 22 of the second dummy light source unit 20 after the end of step S38 to be described later). Note that, determination in step S28 can even be performed by computing an amount of adjustment W and determining whether the amount of adjustment W is zero (or regarded as being in the neighborhood of zero).

On the other hand, when NO is determined in step S28, the CPU 30a causes the PD 37 to measure an optical power in the used frequency band and thus acquires a measurement result (step S30). Note that, in step S30, a measurement result acquired at the time when NO is determined in step S28 can even be acquired by causing the PD 37 to perform measurement at all times. The CPU 30a computes a difference between the apparatus output power T (the setting value in the external terminal apparatus 4) and the optical power measurement value (PD measurement value) acquired by the PD 37 (step S31), and determines whether the difference exists (step S32).

When the difference exists (YES in step S32), the CPU 30a computes an amount of adjustment U (=PD measurement value−T), and performs FB on a previous amount of attenuation+U as an amount of output power attenuation (step S33). The FB can be performed by returning the process to step S22. In other words, the FB can be performed by causing the CPU 30a to transmit information for an amount of output power attenuation indicating the amount of output power attenuation incremented by +U to the WSS 12 of the first dummy light source unit 10 (to the WSS 22 of the second dummy light source unit 20 after the end of step S38).

When the difference does not exist (NO in step S32), the CPU 30a determines whether the first dummy light source unit 10 is currently being adjusted (step S34). When the first dummy light source unit 10 serves as a target for adjustment (YES in step S34), the CPU 30a records various types of information in the nonvolatile memory 30b (step S35). The various types of information recorded herein include waveform information (a center frequency interval of 50 GHz and a bandwidth of 50 GHz), information for an amount of output power attenuation, and a set of a dummy light channel and optical power measurement information (OCM measurement information), for the first dummy light source unit 10.

The CPU 30a transmits an instruction (output interruption information) to interrupt the output of the dummy light to the first dummy light source unit 10 via the path a1, and transmits an instruction to start the second dummy light source unit 20 to the second dummy light source unit 20 via a path a2 (step S36). The instruction to start indicates an instruction to start the second dummy light source unit 20 by using the waveform information and the information for the amount of output power attenuation for the first dummy light source unit 10 recorded in the nonvolatile memory 30b.

In accordance with the instruction issued in step S36, the first dummy light source unit 10 sets the output interruption information in the WSS 12, and thus stops outputting all the channels of the dummy light (step S37). In accordance with the instruction issued in step S36 as well, the second dummy light source unit 20 sets the waveform information and the information for the amount of output power attenuation in the WSS 22, and thus outputs all channels of dummy light, as illustrated as dummy light DL2 in FIG. 9 (step S38). After that, the process returns to step S24, and processing associated with the second dummy light source unit 20 is performed.

On the other hand, when the second dummy light source unit 20 serves as a target for adjustment (NO in step S34), the CPU 30a records various types of information in the nonvolatile memory 30b (step S39). The various types of information recorded herein include waveform information (a center frequency interval of 50 GHz and a bandwidth of 50 GHz), information for an amount of output power attenuation, and a set of a dummy light channel and optical power measurement information (OCM measurement information), for the second dummy light source unit 20.

The CPU 30a transmits an instruction to output an odd channel and interrupt an even channel to the first dummy light source unit 10 via the path a1, and transmits an instruction to output an even channel and interrupt an odd channel to the second dummy light source unit 20 via the path a2 (step S40).

In accordance with the instruction issued in step S40, the first dummy light source unit 10 sets, in the WSS 12, the information for the amount of output power attenuation of the odd channel recorded in the nonvolatile memory 30b and included in the instruction, and further sets output interruption information for the even channel in the WSS 12 (step S41). In step S41, by such setting, an odd channel of dummy light is output from the WSS 12, as illustrated as dummy light DL3 in FIG. 9. The first dummy light source unit 10 notifies the CPU 30a of the completion of adjustment of the first dummy light source unit 10 itself via a path b1 (step S42).

In accordance with the instruction issued in step S40, the second dummy light source unit 20 sets, in the WSS 22, the information for the amount of output power attenuation of the even channel recorded in the nonvolatile memory 30b and included in the instruction, and further sets output interruption information for the odd channel in the WSS 22 (step S43). In step S43, by such setting, an even channel of dummy light is output from the WSS 22, as illustrated as the dummy light DL3 in FIG. 9. The second dummy light source unit 20 notifies the CPU 30a of the completion of adjustment of the second dummy light source unit 20 itself via a path b2 (step S44).

Upon receiving the notifications of the completion of adjustment for the first dummy light source unit 10 and the second dummy light source unit 20 transmitted in steps S42 and S44, the CPU 30a notifies the external terminal apparatus 4 of the completion of the dummy light adjustment processing (step S45). Note that, by the transmission of the notifications, YES can be determined in step S16 in FIG. 4, and the completion of adjustment can be confirmed in the external terminal apparatus 4 as well.

Figure 10:
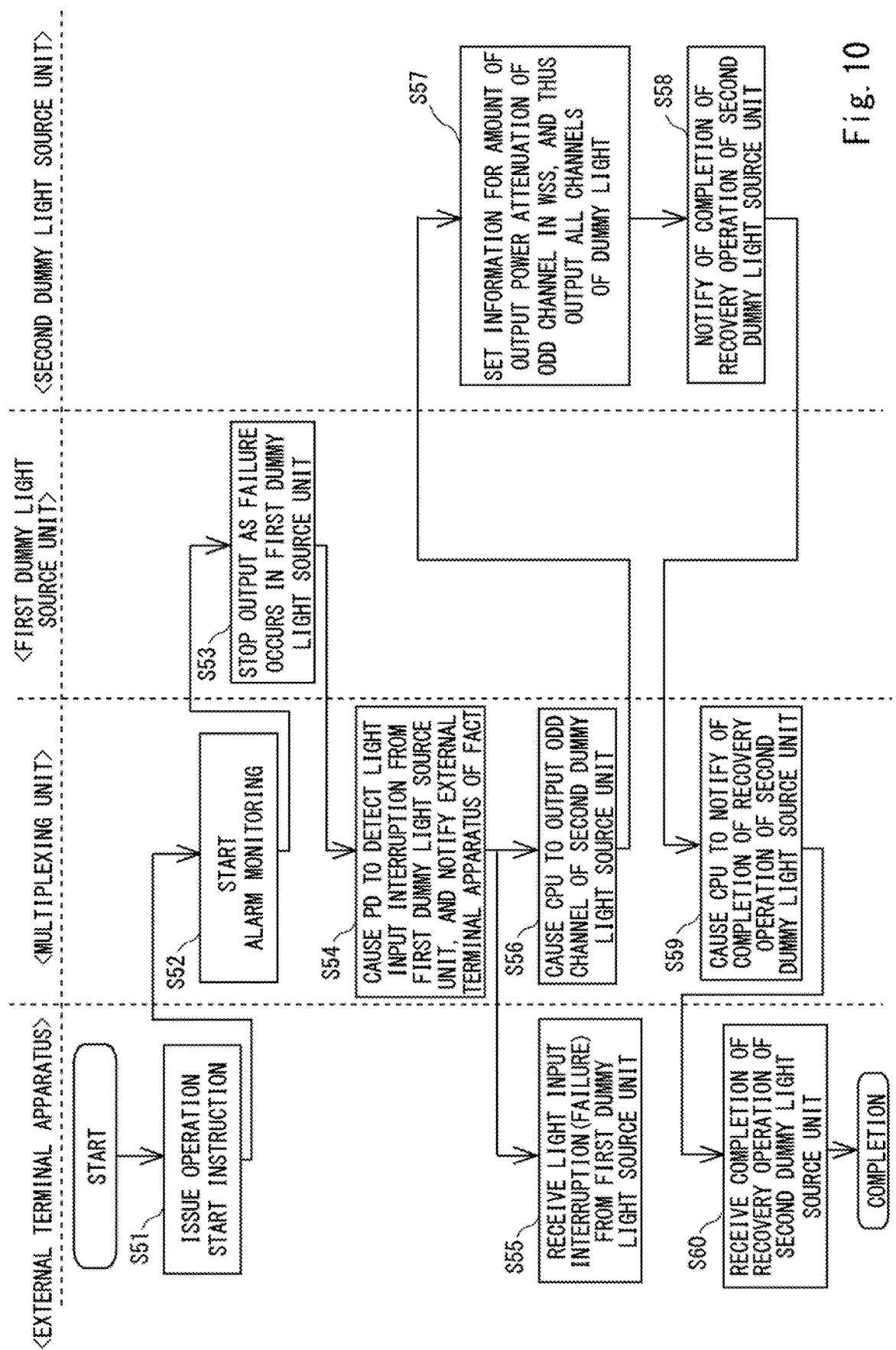
FIG. 10 is a flowchart for describing one example of dummy light compensation processing (recovery processing) performed when a first dummy light source unit has failed in the optical wavelength multiplexing transmission apparatus illustrated in FIG. 3.
Figure 11:
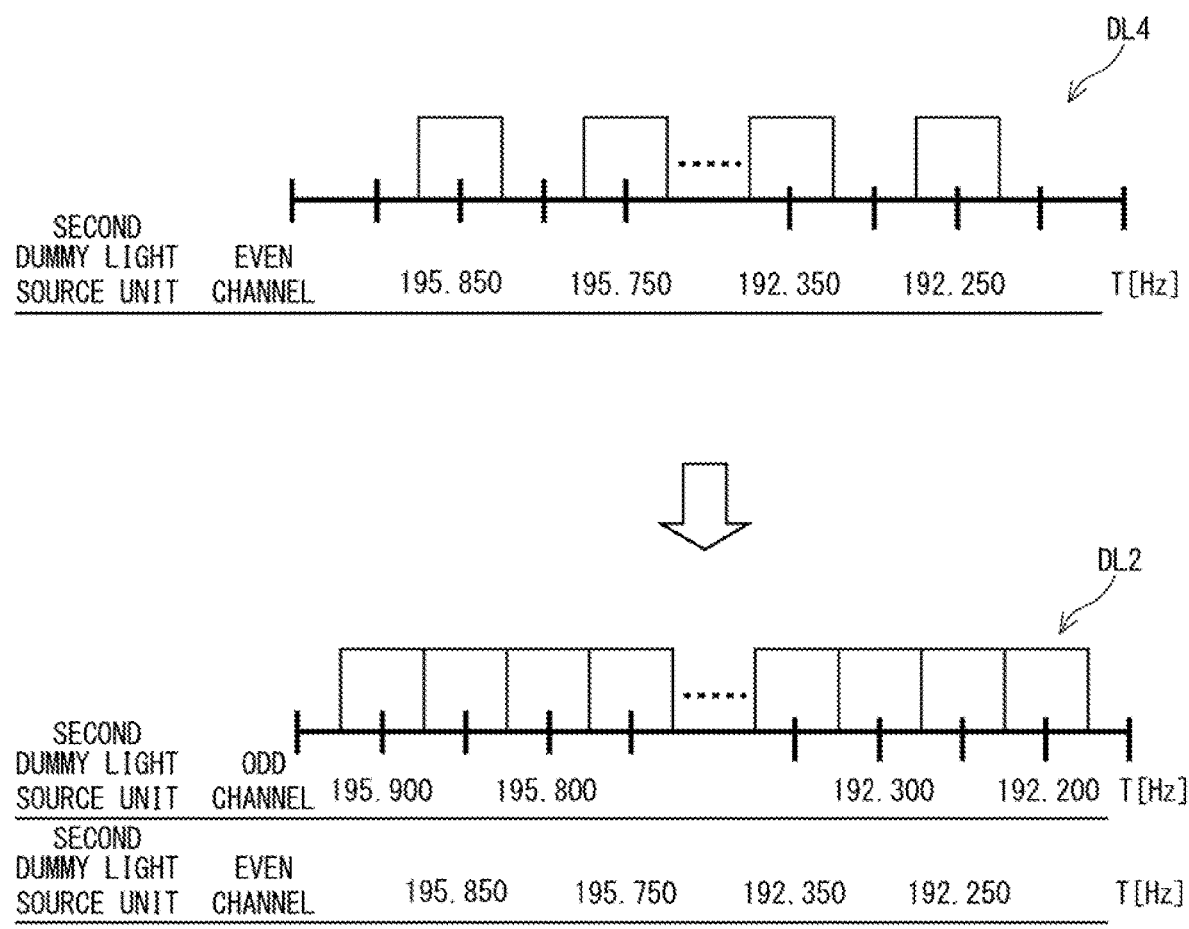
FIG. 11 is a schematic diagram illustrating a transition example of an optical signal arrangement of dummy light adjusted by the recovery processing illustrated in FIG. 10.

One example of dummy light compensation processing (recovery processing) performed when the first dummy light source unit 10 has failed (has become abnormal) in the optical wavelength multiplexing transmission apparatus 3 will be described below with reference to FIGS. 10 and 11, from a stage of starting operation. Note that, basically similar view applies even when the second dummy light source unit 20 has failed. FIG. 10 is a flowchart for describing the recovery processing. Note that, the recovery processing can also be referred to as failure recovery processing. FIG. 11 is a schematic diagram illustrating a transition example of an optical signal arrangement of dummy light adjusted by the recovery processing illustrated in FIG. 10.

The operation of the optical wavelength multiplexing transmission apparatus 3 is started by transmitting an operation start instruction from the external terminal apparatus 4 to the CPU 30a (step S51), and receiving the instruction by the CPU 30a. The start instruction can be trigged by a user operation and the like. Note that, the CPU 30a can record an operation-in-progress state generated upon the start of operation in the nonvolatile memory 30b, together with a start date and time and the like.

In the multiplexing unit 30, the CPU 30a receives the operation start instruction, and starts alarm monitoring for monitoring presence or absence of light input interruption information being transmitted from the PD 31 via a path c1 and being transmitted from the PD 32 via a path c2, and the like (step S52).

A case (step S53) where a failure occurs in the first dummy light source unit 10, and then outputting the dummy light is stopped, as illustrated as dummy light DL4 in FIG. 11, will be described below. The CPU 30a detects the output stop, that is, occurrence of input interruption from the first dummy light source unit 10 by acquiring the light input interruption information from the PD 31, and notifies the external terminal apparatus 4 of the fact that the first dummy light source unit 10 has failed (step S54). The external terminal apparatus 4 receives the notification, that is, the fact that the first dummy light source unit 10 has failed and light input from the first dummy light source unit 10 has been interrupted (step S55).

In relation to step S54, the first dummy light source unit 10 can include a failure detection function for detecting a failure and transmitting failure information to the CPU 30a. The CPU 30a can even receive the failure information from the first dummy light source unit 10 via the path b1, and even when the CPU 30a receives such failure information, the CPU 30a notifies the external terminal apparatus 4 of the fact that the first dummy light source unit 10 has failed, and similarly performs process in step S56 and subsequent steps to be described later. The second dummy light source unit 20 can similarly include a failure detection function, as a matter of course.

Subsequently to step S54, the CPU 30a outputs, to the second dummy light source unit 20 via the path a2, an instruction to output the odd channel that has been output from the first dummy light source unit 10 but is interrupted due to the failure (step S56). The instruction can be implemented as an instruction including the information for the amount of output power attenuation of the odd channel recorded in the nonvolatile memory 30b. Note that, the information for the amount of output power attenuation is implemented as information recorded for the second dummy light source unit 20, but can also be implemented as information recorded for the first dummy light source unit 10. In accordance with the instruction issued in step S56, the second dummy light source unit 20 sets, in the WSS 22, the information for the amount of output power attenuation of the odd channel included in the above-mentioned instruction. By the setting, all channels of dummy light are output from the WSS 22, as illustrated as dummy light DL2 in FIG. 11 (step S57).

In the dummy light DL2 in FIG. 11, a state after adjustment to output based on the setting value is finally performed is illustrated, but the channel output may be gradually adjusted initially starting from a value smaller than those of other channels. In this manner, the CPU 30a can adjust the WSS 22 in such a way as to compensate for an optical output power generated by dummy light of an odd channel in the side of the first dummy light source unit 10 being detected to have an abnormality (an optical output power generated by the interrupted dummy light). The compensation is performed by the optical output power of dummy light of an added channel.

The second dummy light source unit 20 notifies the CPU 30a of the completion of the recovery operation (recovery operation cancellation information) via the path b2 (step S58). Upon receiving the notification, the CPU 30a notifies the external terminal apparatus 4 of the completion of the recovery operation (recovery operation cancellation information) by the second dummy light source unit 20 (step S59). The external terminal apparatus 4 receives the notification of the completion of the recovery operation of the second dummy light source unit 20 (step S60), and the completion of the recovery operation can thus be confirmed in the external terminal apparatus 4.

Figure 12:
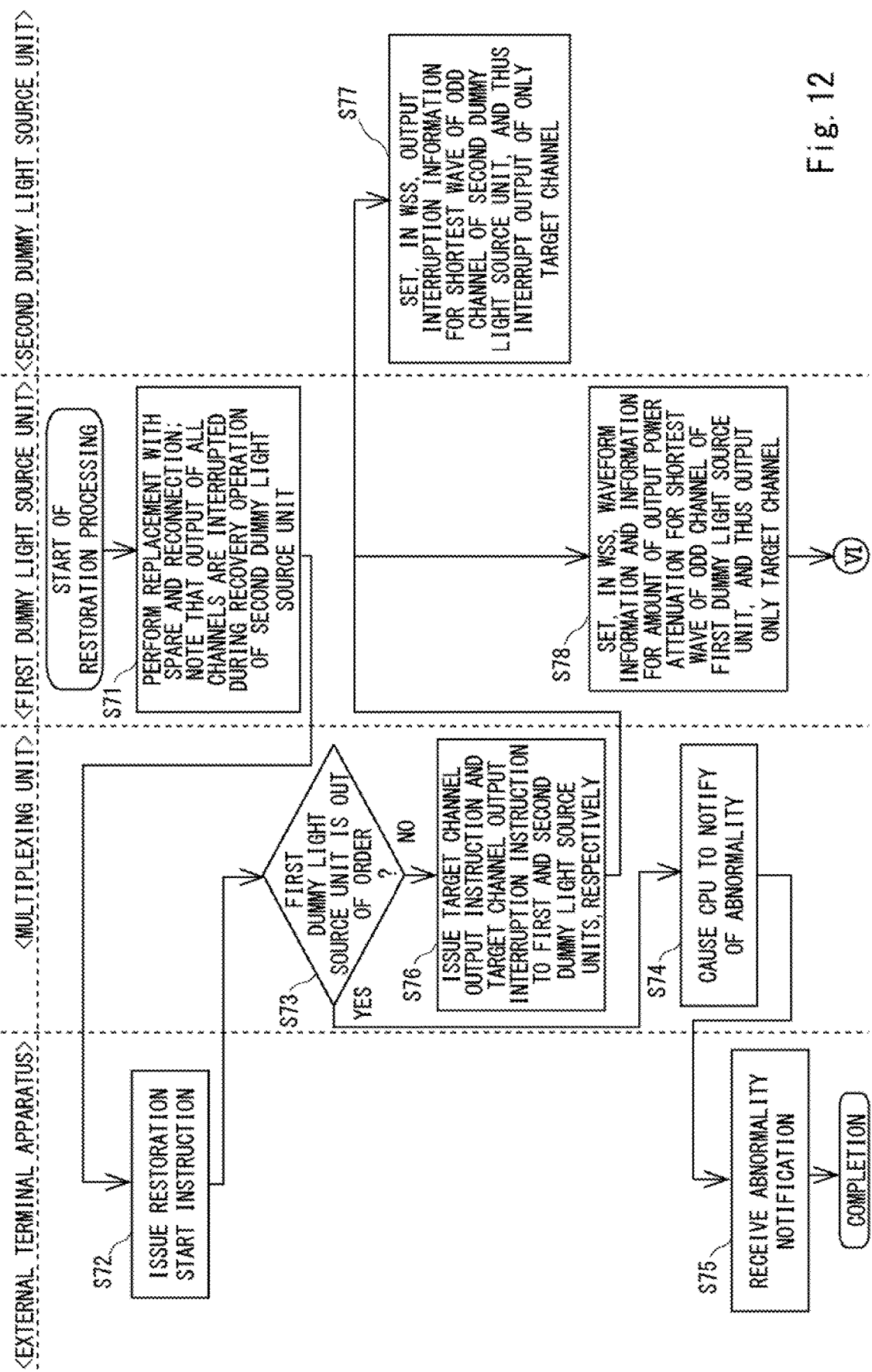
FIG. 12 is a flowchart for describing one example of restoration processing performed when the first dummy light source unit is replaced in the optical wavelength multiplexing transmission apparatus illustrated in FIG. 3.
Figure 13:
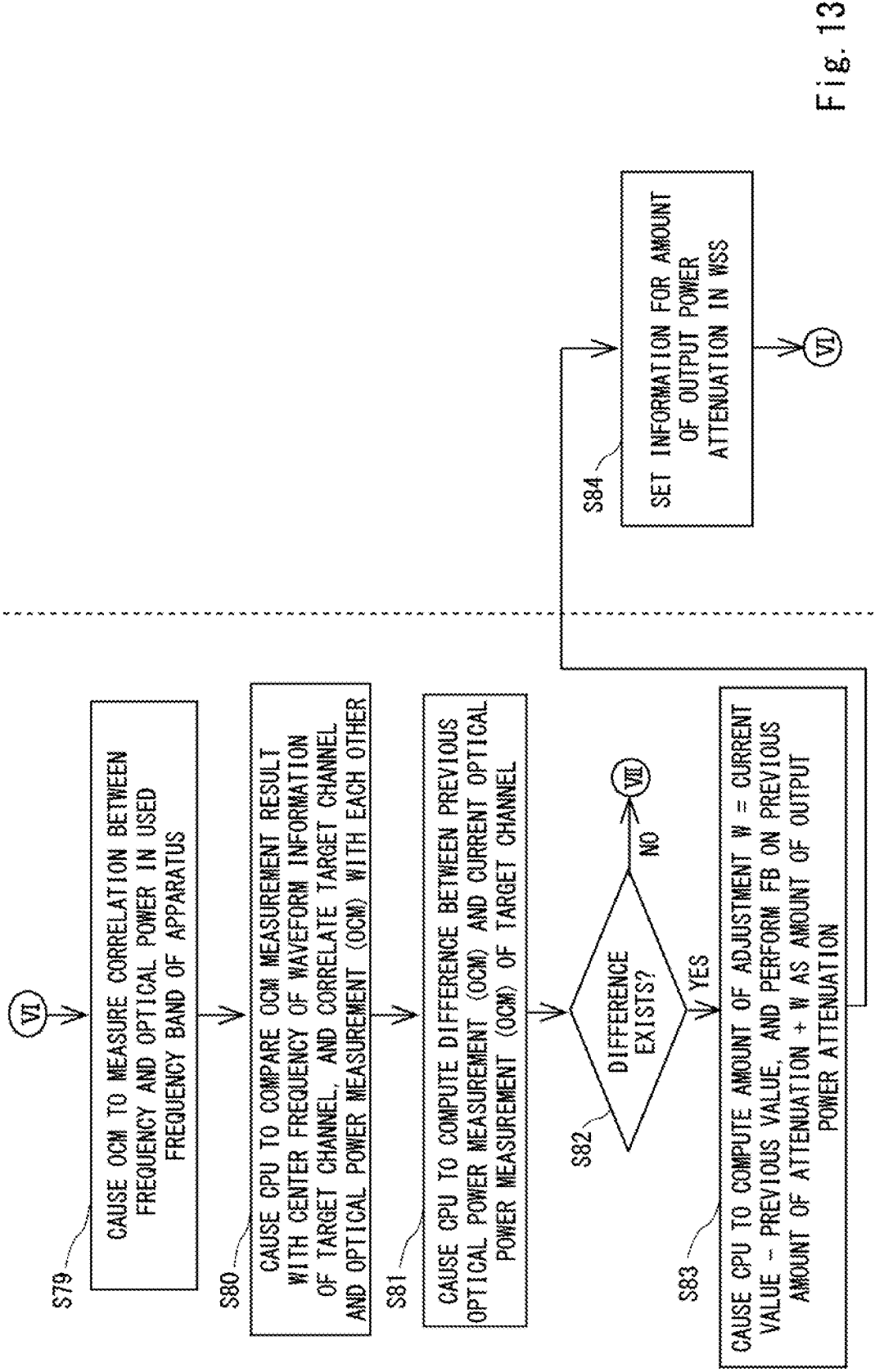
FIG. 13 is a flowchart continued from FIG. 12.
Figure 14:
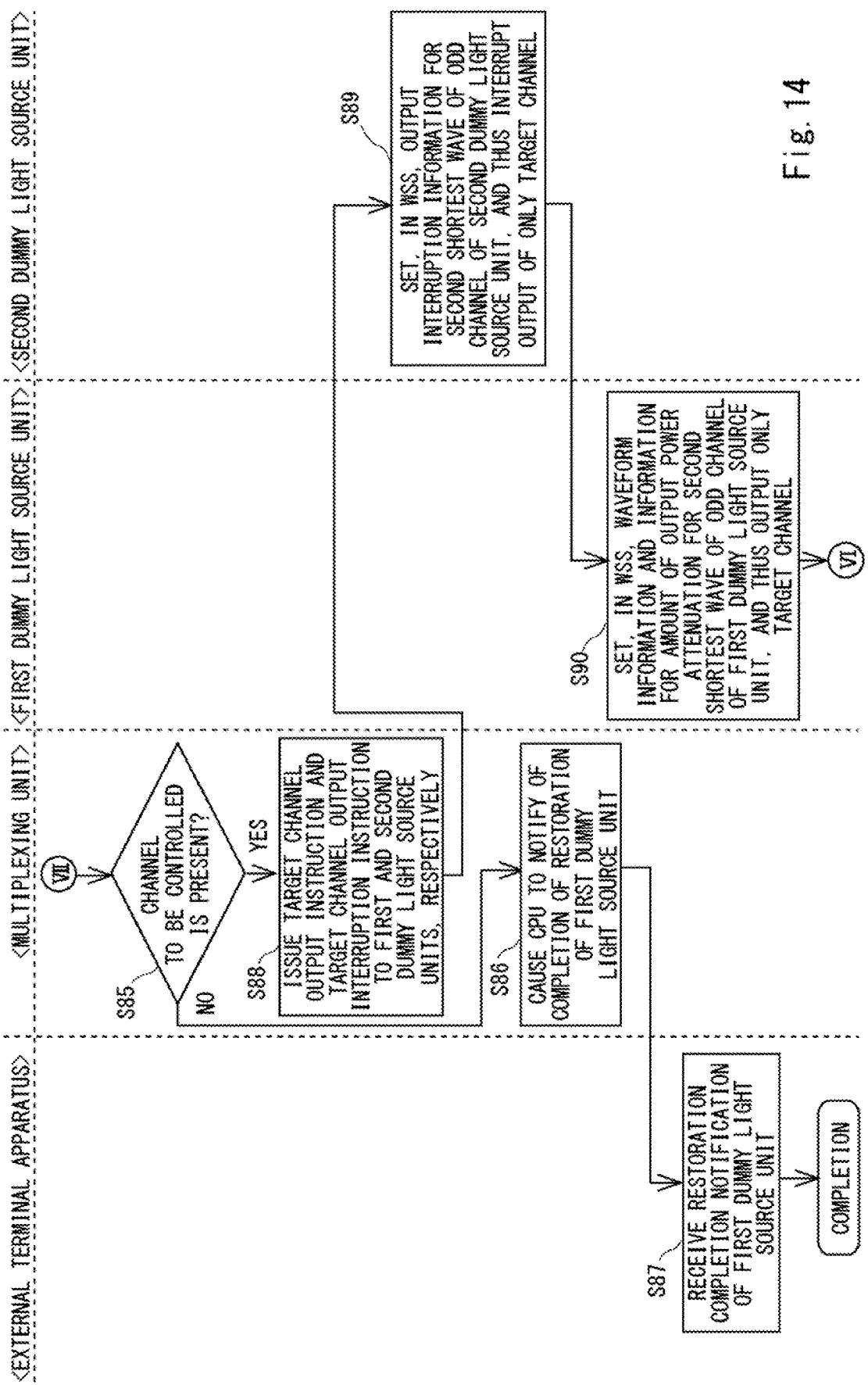
FIG. 14 is a flowchart continued from FIG. 13.
Figure 15:
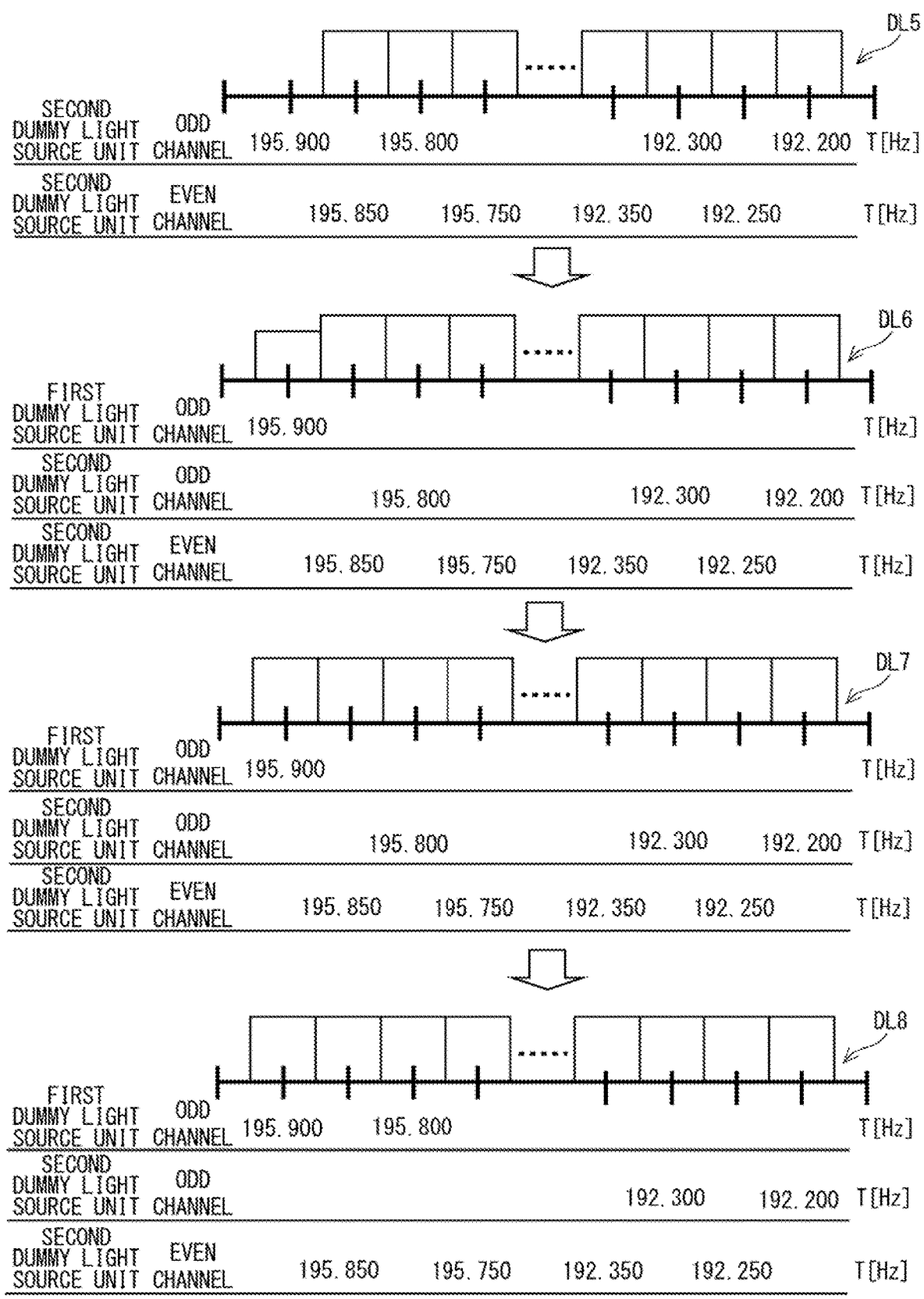
FIG. 15 is a schematic diagram illustrating a transition example of an optical signal arrangement of dummy light adjusted by the restoration processing illustrated in FIGS. 12 to 14.
Figure 16:
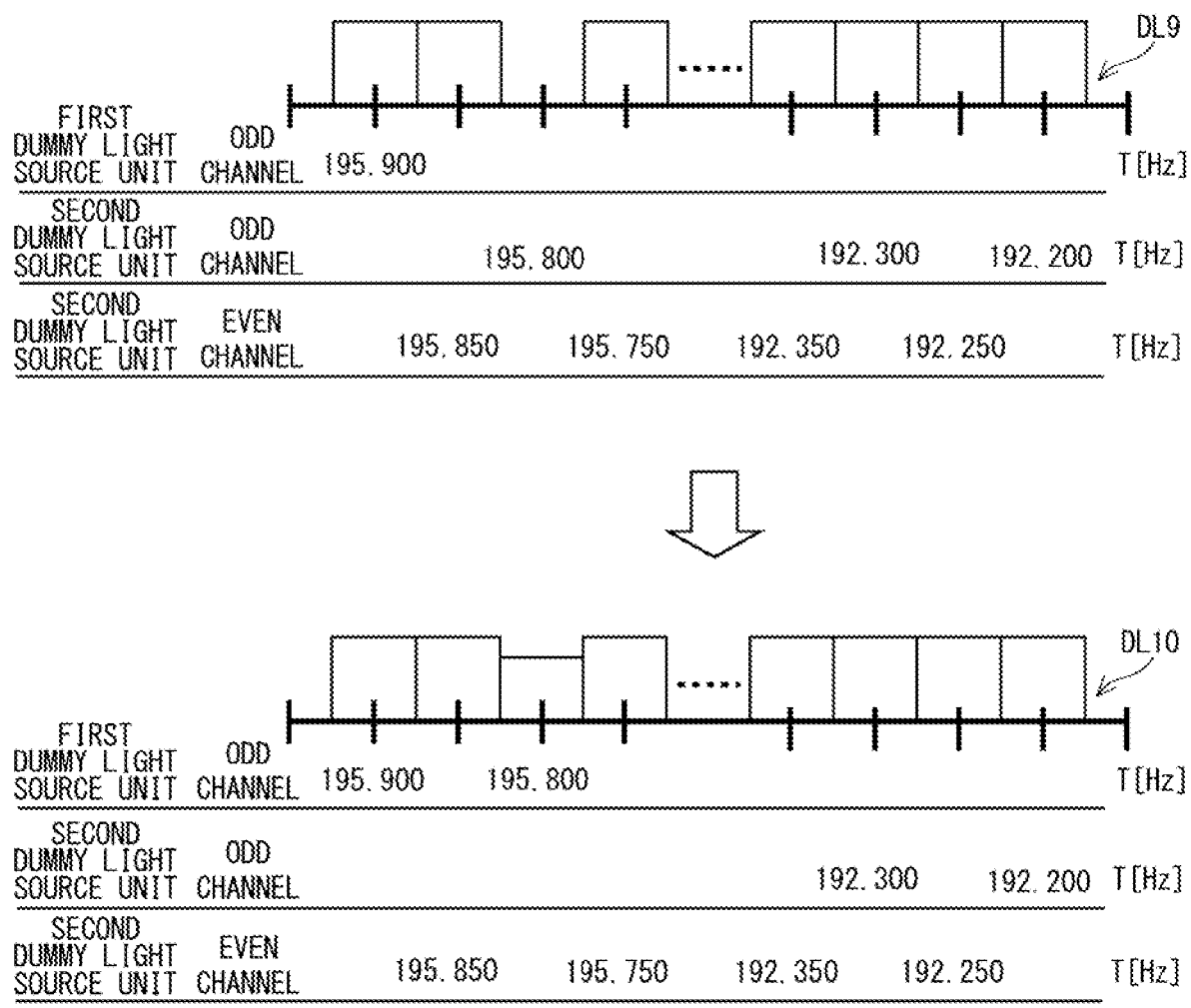
FIG. 16 is a schematic diagram illustrating a transition example continued from FIG. 15.

One example of restoration processing performed when the first dummy light source unit 10 is replaced as a failure unit (after replacement of the failure unit) in the optical wavelength multiplexing transmission apparatus 3 will be described below with reference to FIGS. 12 to 16. Note that, similar description applies to replacement of a part of the first dummy light source unit 10, and basically similar view applies even when the second dummy light source unit 20 is replaced due to a failure. FIG. 12 is a flowchart for describing the restoration processing, FIG. 13 is a flowchart continued from FIG. 12, and FIG. 14 is a flowchart continued from FIG. 13. FIG. 15 is a schematic diagram illustrating a transition example of an optical signal arrangement of dummy light adjusted by the restoration processing illustrated in FIGS. 12 to 14, and FIG. 16 is a schematic diagram illustrating a transition example continued from FIG. 15.

First, when the recovery processing of the second dummy light source unit 20 is not completed and is in operation at the time when the first dummy light source unit 10 is replaced with a spare, the first dummy light source unit 10 interrupts the output of all the channels of the first dummy light source unit 10 (step S71). Step S71 also includes processing of reconnecting optical wiring to the first dummy light source unit 10 after replacement. Note that, in a stage of replacement with a spare, when the recovery processing of the second dummy light source unit 20 is completed, the output of all the channels has been interrupted in the first dummy light source unit 10.

After optical wiring is reconnected, a user issues an instruction, from the external terminal apparatus 4, to start restoration processing associated with the replacement of the first dummy light source unit 10 (step S72). The instruction is transmitted from the external terminal apparatus 4 to the CPU 30a. The CPU 30a determines whether the first dummy light source unit 10 after replacement has an abnormality (is out of order) (step S73), and notifies the external terminal apparatus 4 of an abnormality when the abnormality exists (step S74). In this case, the external terminal apparatus 4 receives the abnormality and ends the process (step S75). Note that, such determination need only be performed by a predetermined determination method, regardless of a method for determining presence or absence of an abnormality in step S73.

When no abnormality exists in the first dummy light source unit 10 after replacement (NO in step S73), the CPU 30a transmits the following instruction. That is, the CPU 30a transmits an instruction (output interruption information) to interrupt output of a shortest wave of an odd channel to the second dummy light source unit 20 via the path a2, and transmits an instruction to set a shortest wave of an odd channel to the first dummy light source unit 10 via the path a1 (step S76). The former instruction can include information indicating the shortest wave of the odd channel of the second dummy light source unit 20 recorded in the nonvolatile memory 30b. The latter instruction is defined as an instruction to perform setting based on the waveform information and the information for the amount of output power attenuation for the shortest wave of the odd channel of the first dummy light source unit 10 recorded in the nonvolatile memory 30b.

In accordance with the instruction issued in step S76, the second dummy light source unit 20 sets, in the WSS 22, the output interruption information for the shortest wave of the odd channel of the second dummy light source unit 20, and thus interrupts the output of only the target channel (step S77). The target channel, the output of which is interrupted herein, is one illustrated as a channel having a center frequency of 195.900 THz in dummy light DL5 in FIG. 15.

In accordance with the instruction issued in step S76, the first dummy light source unit 10 sets, in the WSS 12, the waveform information and the information for the amount of output power attenuation for the shortest wave of the odd channel of the first dummy light source unit 10, and thus outputs only the target channel (step S78). The target channel output herein is one illustrated as a channel having a center frequency of 195.900 THz in dummy light DL6 in FIG. 15. Note that, an example in which the output of the channel in the dummy light DL6 takes a value smaller than those of other channels is taken in FIG. 15, but this is to describe an example in which it is determined in step S82 to be described later that the difference exists, and adjustment to output based on the setting value is finally performed.

In the multiplexing unit 30, the OCM 38 measures a correlation between the frequency and the optical power in the used frequency band of the optical wavelength multiplexing transmission apparatus 3 (step S79). Note that, step S79 can be executed after waiting for the completion of the processes in steps S77 and S78. The CPU 30a compares the OCM measurement result with the center frequency indicated by the waveform information of the target channel, and correlates the target channel and the optical power measurement value (OCM measurement value) with each other (step S80). The CPU 30a computes a difference between the previous optical power measurement value (previous OCM measurement value) of the target channel recorded in the nonvolatile memory 30b and the current optical power measurement value (current OCM measurement value) of the target channel (step S81).

The CPU 30a determines whether the difference exists (step S82), and when the difference exists (YES in step S82), the CPU 30a computes an amount of adjustment W (=current value−previous value), and performs FB on the previous amount of attenuation+W as an amount of output power attenuation (step S83). The FB can be performed by causing the CPU 30a to transmit information for an amount of output power attenuation indicating the amount of output power attenuation incremented by +W to the WSS 12 of the first dummy light source unit 10, and causing the first dummy light source unit 10 to set the information for the amount of output power attenuation (step S84). After step S84, the process returns to step S79.

On the other hand, when the difference does not exist (NO in step S82), as illustrated as dummy light DL7 or DL8 in FIG. 15, the CPU 30a determines whether a channel to be controlled is present (remains) (step S85). Note that, the dummy light DL7 represents a case where a shortest wave (195.900 THz) is adjusted as the channel to be controlled, and the dummy light DL8 represents a case where a second shortest wave (195.800 THz) after the shortest wave is adjusted as the channel to be controlled.

When no channel to be controlled is present (NO in step S85), as illustrated as the dummy light DL3 in FIG. 9, the CPU 30a notifies the external terminal apparatus 4 of the completion of failure unit restoration of the first dummy light source unit 10 (step S86). The external terminal apparatus 4 receives the notification (step S87), and ends the process.

On the other hand, when a channel to be controlled is present (YES in step S85), the CPU 30a transmits the following instruction. That is, the CPU 30a transmits an instruction (output interruption information) to interrupt the output of a second shortest wave of an odd channel to the second dummy light source unit 20 via the path a2, and transmits an instruction to set a second shortest wave of an odd channel to the first dummy light source unit 10 via the path a1 (step S88). The former instruction can include information indicating the second shortest wave of the odd channel of the second dummy light source unit 20 recorded in the nonvolatile memory 30b. The latter instruction is defined as an instruction to perform the setting based on the waveform information and the information for the amount of output power attenuation for the second shortest wave of the odd channel of the first dummy light source unit 10 recorded in the nonvolatile memory 30b.

In accordance with the instruction issued in step S88, the second dummy light source unit 20 sets, in the WSS 22, the output interruption information for the second shortest wave of the odd channel of the second dummy light source unit 20, and thus interrupts the output of only the target channel (step S89). The target channel, the output of which is interrupted herein, is one illustrated as a channel having a center frequency of 195.800 THz in dummy light DL9 in FIG. 16.

In accordance with the instruction issued in step S88, the first dummy light source unit 10 sets, in the WSS 12, the waveform information and the information for the amount of output power attenuation for the second shortest wave of the odd channel of the first dummy light source unit 10, and thus outputs only the target channel (step S90). After step S90, the process returns to step S79. The target channel output in step S90 is one illustrated as a channel having a center frequency of 195.800 THz in dummy light DL10 in FIG. 16. Note that, an example in which the output of the channel in the dummy light DL10 takes a value smaller than those of other channels is taken in FIG. 16, but it is determined in step S82 after the process returns to step S79 that the difference exists after the process returns to step S79, and adjustment to output based on the setting value is finally performed.

Figure 17:
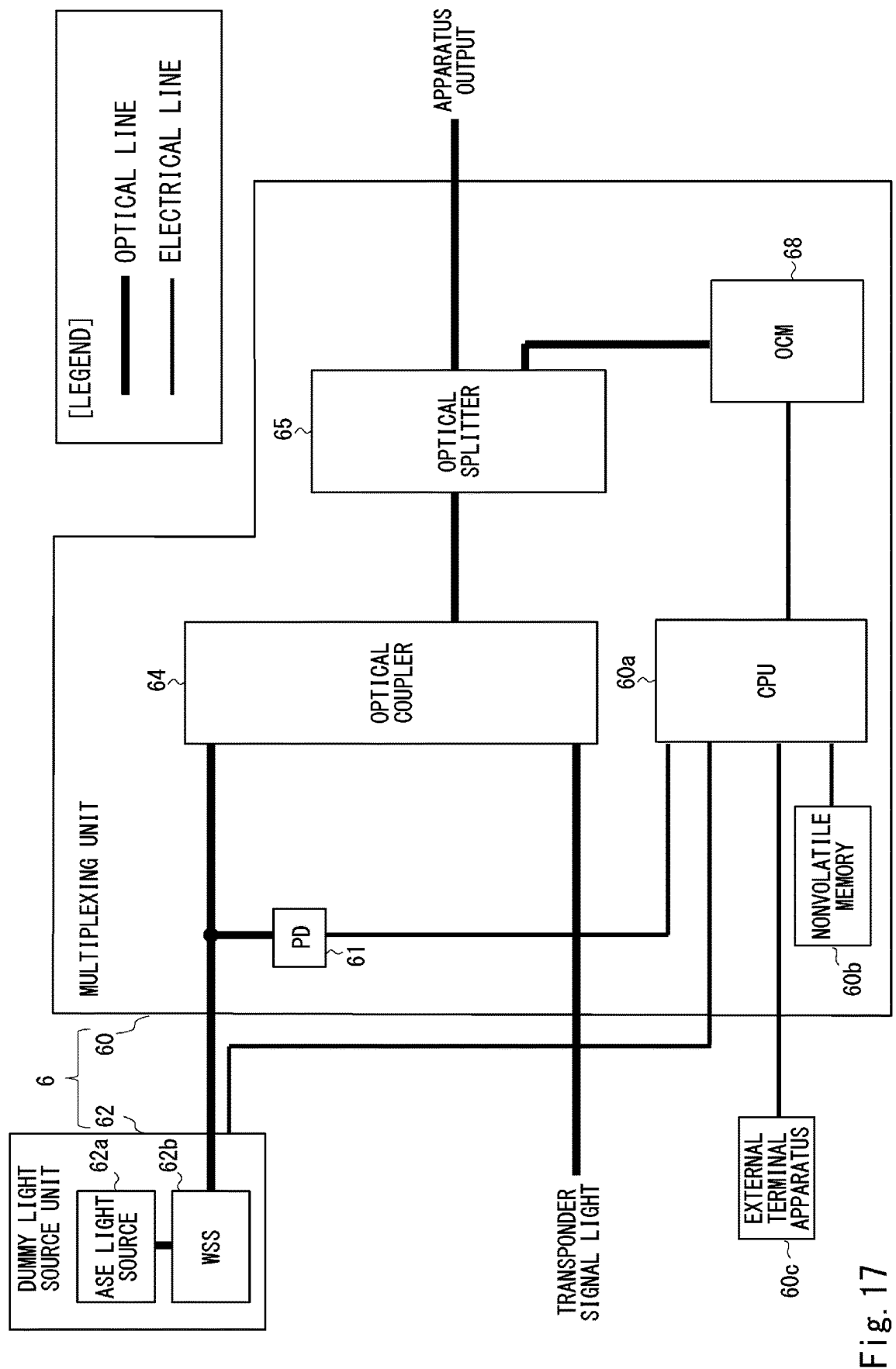
FIG. 17 is a block diagram illustrating a configuration of an optical wavelength multiplexing transmission apparatus according to a comparative example.

To describe the advantageous effects according to the present example embodiment, an optical wavelength multiplexing transmission apparatus according to a comparative example will be described below with reference to FIG. 17. FIG. 17 is a block diagram illustrating a configuration of the optical wavelength multiplexing transmission apparatus according to the comparative example. Note that, boldest lines connecting components to each other in FIG. 17 indicate optical communication lines formed by optical fiber core wires or the like.

An optical wavelength multiplexing transmission apparatus 6 according to the comparative example is equipped with one dummy light source unit 62 for correcting total optical power in the used frequency band when no transponder signal light is inserted, and a multiplexing unit 60 together, as illustrated in FIG. 17. The dummy light source unit 62 includes an ASE light source 62a for emitting ASE light to be used as dummy light, and a WSS 62b for performing division control and optical power control of the ASE light.

The multiplexing unit 60 includes a CPU 60a that controls the overall multiplexing unit 60, a nonvolatile memory 60b that stores various types of information, a PD 61 that detects light input interruption from the dummy light source unit 62, and an optical coupler 64 that multiplexes the transponder signal light and the light (dummy light) input from the PD 61. The multiplexing unit 60 further includes an optical splitter 65 that is connected to the optical coupler 64 and splits the multiplexed light, and an OCM 68 serving as a monitor circuit that monitors the multiplexed light branched by the optical splitter 65. The other multiplexed light branched by the optical splitter 65 serves as an apparatus output of the optical wavelength multiplexing transmission apparatus 6. An external terminal apparatus 60c is connected to the CPU 60a in order to perform various types of setting by a user.

Since the optical wavelength multiplexing transmission apparatus 6 simply has the ASE light source 62a and the WSS 62b connected in series with each other and has no other redundant configuration, when any part fails, the dummy light stops being output, and thus it becomes a state that correction of the total optical power is difficult.

To overcome the problem, as described above, the optical wavelength multiplexing transmission apparatus 3 according to the present example embodiment is provided with a redundant configuration of a dummy light source that corrects the total optical power in the used frequency band when no transponder signal light is inserted, and the redundant configuration can perform the following control. That is, the redundant configuration alternately outputs an odd channel from the first dummy light source unit 10 and an even channel from the second dummy light source unit 20 in the normal state, as illustrated as the dummy light DL3. When a failure occurs in the first dummy light source unit 10, and then outputting the odd channel is stopped, an amount of total optical power attenuation is as small as a half because the even channel of the second dummy light source unit 20 remains. In the present example embodiment, furthermore, the total optical power can be automatically restored by immediately emitting an odd channel from the second dummy light source unit 20. This makes it possible to suppress influence on the transponder signal as much as possible more reliably in the present example embodiment than that in the comparative example.

As described above, in the present example embodiment, dummy light sources are made redundant by providing the first dummy light source unit 10 and the second dummy light source unit 20, and making the channels output from each of the first dummy light source unit 10 and the second dummy light source unit 20 usable in the normal state. Hence, in the present example embodiment, even when either one of the first dummy light source unit 10 and the second dummy light source unit 20 fails, the other unit can automatically restore the total optical power of the output of the optical wavelength multiplexing transmission apparatus 3, resulting in increased reliability of the dummy light source. In the present example embodiment, in addition, even at a moment either unit fails, since a half of all channels in the other unit remain, a temporal change in power of the transponder signal can be kept less than in a state in which no dummy light is input. In the present example embodiment, therefore, even at a moment of such a failure, influence on the signal can be suppressed as much as possible.

Third Example Embodiment

Figure 18:
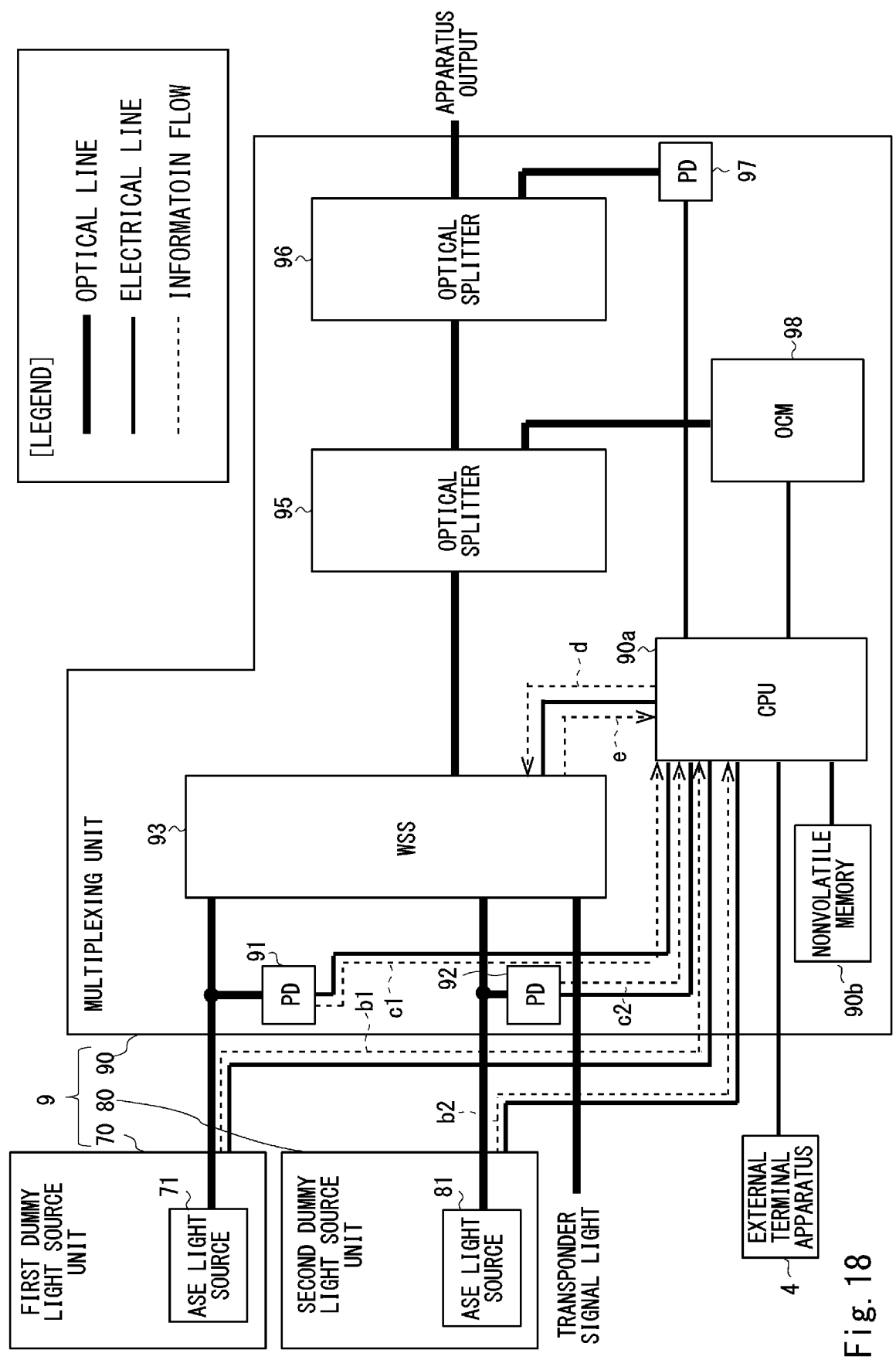
FIG. 18 is a block diagram illustrating one configuration example of an optical wavelength multiplexing transmission apparatus according to a third example embodiment.

A third example embodiment will be described below with reference to FIG. 18, while focusing on differences from the second example embodiment, and a description of parts corresponding to those in the second example embodiment will be omitted where necessary. Various examples as described in the first and second example embodiments, however, are applicable to the third example embodiment as appropriate. FIG. 18 is a block diagram illustrating one configuration example of an optical wavelength multiplexing transmission apparatus according to the third example embodiment. Note that, boldest lines connecting components to each other in FIG. 18 indicate optical communication lines formed by optical fiber core wires or the like.

An optical wavelength multiplexing transmission apparatus 9 according to the present example embodiment is implemented by mounting the WSSs 12 and 22 on a multiplexing unit side in the optical wavelength multiplexing transmission apparatus 3 illustrated in FIG. 3, as illustrated in FIG. 18.

Specifically, the optical wavelength multiplexing transmission apparatus 9 can include a first dummy light source unit 70 implemented by omitting the WSS 12 from the first dummy light source unit 10, a second dummy light source unit 80 implemented by omitting the WSS 22 from the second dummy light source unit 20, and a multiplexing unit 90 in which the functions of the WSSs 12 and 22 are incorporated. The first dummy light source unit 70 includes an ASE light source 71 corresponding to the ASE light source 11, and the second dummy light source unit 80 includes an ASE light source 81 corresponding to the ASE light source 21.

The multiplexing unit 90 can include a WSS 93 integrating the functions of WSSs 12 and 22 as a common WSS in order to incorporate the functions in the multiplexing unit 90, and including the functions of the optical couplers 33 and 34 as well. In this manner, the optical wavelength multiplexing transmission apparatus 9 includes, in the multiplexing unit 90 as the common WSS 93, a WSS that adjusts waveforms and amounts of output power attenuation of dummy light channels of the first dummy light source unit 70 and the second dummy light source unit 80. The WSS 93 even multiplexes dummy light and transponder signal light.

The WSS 93 can be interpreted as one example of a following selection unit. That is, the above-mentioned selection unit selects, as dummy light to be multiplexed with signal light of a main signal, dummy light of an odd channel from dummy light input from the first dummy light source unit 70, and also select dummy light of an even channel from dummy light input from the second dummy light source unit 80.

The multiplexing unit 90 can include a CPU 90*a* that is connected to an external terminal apparatus 4 and controls the overall optical wavelength multiplexing transmission apparatus 9, a nonvolatile memory 90*b*, PDs 91 and 92, optical splitters 95 and 96, a PD 97, and an OCM 98. The nonvolatile memory 90*b*, the PDs 91 and 92, the optical splitters 95 and 96, the PD 97, and the OCM 98 are parts corresponding to the nonvolatile memory 30*b*, the PDs 31 and 32, the optical splitters 35 and 36, the PD 37, and the OCM 38, respectively.

Herein, the WSS 93 is connected to a subsequent stage of the PDs 91 and 92, and the optical splitter 95 is connected to a subsequent stage of the WSS 93. Various setting values input from the external terminal apparatus 4 are set in the WSS 93 by outputting the values to the WSS 93 via a path d by the CPU 90*a* in cooperation with the nonvolatile memory 90*b*. The WSS 93 transmits, to the CPU 90*a* via a path e, a notification of adjustment completion indicating completion of dummy light adjustment processing, and a completion notification and a cancellation notification of a recovery operation.

The PD 91 is one example of a photodetector that detects power of light input from the ASE light source 71 of the first dummy light source unit 70, and outputs a detection result to the CPU 90*a* via a path c1. The PD 92 is one example of a photodetector that detects power of light input from the ASE light source 81 of the second dummy light source unit 80, and outputs a detection result to the CPU 90*a* via a path c2.

The PDs 91 and 92 each can, for example, be implemented as circuits that monitor input interruption (input power interruption) for light input from the ASE light sources 71 and 81, respectively. The CPU 90*a* can detect an abnormality of the first dummy light source unit 70 by detecting, based on a monitoring result acquired from the PD 91, input interruption of the dummy light from the first dummy light source unit 70. The CPU 90*a* can also detect an abnormality of the second dummy light source unit 80 by detecting, based on a monitoring result acquired from the PD 92, input interruption of the dummy light from the second dummy light source unit 80.

The CPU 90*a* performs the following control as addition control when no abnormality is found in the first dummy light source unit 70 and an abnormality of the second dummy light source unit 80 is detected, based on the outputs from the PDs 91 and 92. In this case, the CPU 90*a* controls the WSS 93 in such a way as to additionally select (output) dummy light of an even channel from the dummy light input from the first dummy light source unit 70.

In this manner, in the present example embodiment, even when a failure occurs in the second dummy light source unit 80, and then outputting the even channel is stopped, an amount of total optical power attenuation is as small as a half because the odd channel generated by the first dummy light source unit 70 remains. In the present example embodiment, furthermore, total optical power can be automatically restored by immediately emitting an even channel from the light input from the first dummy light source unit 70 in such a case.

The CPU 90*a* further performs the following control as another addition control when no abnormality is found in the second dummy light source unit 80 and an abnormality of the first dummy light source unit 70 is detected, based on the outputs from the PDs 91 and 92. In this case, the CPU 90*a* controls the WSS 93 in such a way as to additionally select (output) dummy light of an odd channel from the dummy light input from the second dummy light source unit 80.

In this manner, in the present example embodiment, even when a failure occurs in the first dummy light source unit 70, and then outputting the odd channel is stopped, the amount of total optical power attenuation is as small as a half because the even channel generated by the second dummy light source unit 80 remains. In the present example embodiment, furthermore, the total optical power can be automatically restored by immediately emitting an odd channel from the light input from the second dummy light source unit 80 in such a case.

The first dummy light source unit 70 can include a failure detection function for detecting a failure and transmitting failure information to the CPU 90*a*. The CPU 90*a* can even receive the failure information from the first dummy light source unit 70 via a path b1, and even when the CPU 90*a* receives such failure information, it need only similarly perform processing. Similar description applies to the second dummy light source unit 80, and such failure information is transmitted to the CPU 90*a* via a path b2, as a matter of course.

According to the present example embodiment as well, it is desired to implement return control similarly to the second example embodiment. In the example, the CPU 90*a* can perform return control for making a return to a state before execution of the above-mentioned addition control when either one of the first dummy light source unit 70 and the second dummy light source unit 80 being detected to have an abnormality is replaced after the above-mentioned addition control.

The CPU 90*a* can, for example, perform the following control as return control after the first dummy light source unit 70 is replaced. That is, the CPU 90*a* can perform, for the WSS 93, not only control for selecting an odd channel from dummy light input from the first dummy light source unit 70, but also the following control. That is, the CPU 90*a* can also perform control for canceling selection of an odd channel from dummy light input from the second dummy light source unit 80 and selecting only an even channel.

The CPU 90*a* can, for example, perform the following control as return control after the second dummy light source unit 80 is replaced. That is, the CPU 90*a* can perform, for the WSS 93, not only control for selecting an even channel from dummy light input from the second dummy light source unit 80, but also the following control. That is, the CPU 90a can also perform control for canceling selection of an even channel from dummy light input from the first dummy light source unit 70 and selecting only an odd channel.

The optical wavelength multiplexing transmission apparatus 9 according to the present example embodiment including the configuration as described above uses a WSS reduced in number from two to one, compared to the optical wavelength multiplexing transmission apparatus 3 according to the second example embodiment. Even according to the present example embodiment, however, dummy light adjustment processing, recovery processing at the time of an abnormality (at the time of failure occurrence), and restoration processing after failure unit replacement can be performed based on views similar to the processing described in the second example embodiment.

As described above, according to the present example embodiment, an advantageous effect of allowing reducing of the selection unit that selects a channel of dummy light exemplified as the WSS can be produced, in addition to the advantageous effects according to the second example embodiment.

Other Example Embodiments

In each of the above-described example embodiments, a function of each unit constituting an optical transmission apparatus has been described, but it need only be possible to achieve the function as an optical transmission apparatus, an optical wavelength multiplexing transmission apparatus, an optical wavelength multiplexing and demultiplexing apparatus, or the like. Various examples as described in each example embodiment can be used in combination where necessary. The optical transmission apparatus can even be incorporated to an optical communication system other than an optical submarine cable system.

Figure 19:
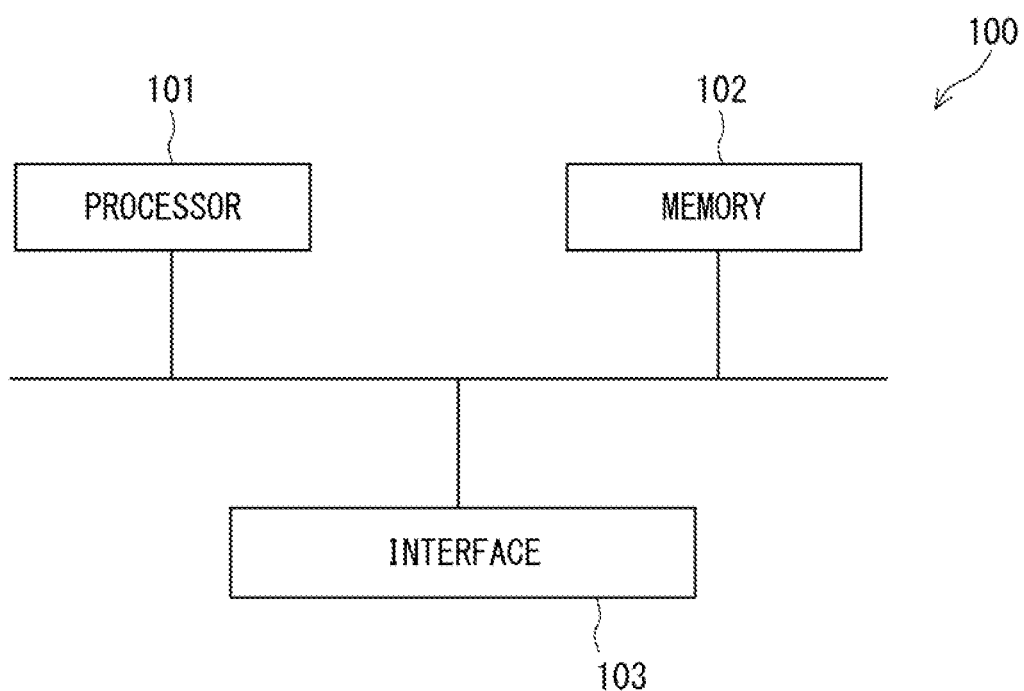
FIG. 19 is a diagram illustrating one example of a hardware configuration of an apparatus.

The optical transmission apparatus or its multiplexing unit according to each example embodiment, or an external monitor and control apparatus can include, for example, the following hardware configuration. FIG. 19 is a diagram illustrating one example of hardware configuration of a part of each apparatus according to each example embodiment.

An apparatus 100 illustrated in FIG. 19 includes a processor 101, a memory 102, and an interface 103. When the apparatus 100 serves as the optical transmission apparatus or the multiplexing unit in the optical transmission apparatus, the interface 103 can be implemented as an interface with a not-illustrated optical device (a PD, an optical coupler, an optical splitter, and the like) or an interface with the external monitor and control apparatus. The function of each unit described in each example embodiment is achieved by causing the processor 101 to read a program stored in the memory 102, and execute the program in cooperation with the interface 103. The program can be implemented as the program described in the first example embodiment or the program including the application example in the second or third example embodiment. When the apparatus 100 serves as the external monitor and control apparatus, the interface 103 can include an interface for connecting the apparatus 100 to the optical transmission apparatus, an operation interface for allowing a user to perform setting and the like, and the like.

The program includes instructions (or software codes) that, when loaded into a computer, cause the computer to perform one or more of the functions described in the embodiments. The program may be stored in a non-transitory computer readable medium or a tangible storage medium. By way of example, and not a limitation, non-transitory computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

The present disclosure can provide an optical transmission apparatus, an optical transmission method, and a program that can make dummy light sources redundant with a configuration requiring only simple control.

The first to third embodiments can be combined as desirable by one of ordinary skill in the art.

While the disclosure has been particularly shown and described with reference to embodiments thereof, the disclosure is not limited to these embodiments. It will be understood by those of ordinary skill in the art that various changes in form and details may be made therein without departing from the spirit and scope of the present disclosure as defined by the claims.

The whole or part of the exemplary embodiments disclosed above can be described as, but not limited to, the following supplementary notes.

(Supplementary Note 1)

An optical transmission apparatus comprising:

a multiplexing unit configured to multiplex signal light of a main signal, dummy light of an odd channel emitted using a first dummy light source as a light source, and dummy light of an even channel emitted using a second dummy light source as a light source;

a detection unit configured to detect an abnormality of the first dummy light source and an abnormality of the second dummy light source; and a control unit configured to perform addition control in such a way that dummy light of an even channel emitted using the first dummy light source as a light source is additionally multiplexed with signal light of the main signal by the multiplexing unit, when no abnormality is found in the first dummy light source and an abnormality of the second dummy light source is detected by the detection unit, and dummy light of an odd channel emitted using the second dummy light source as a light source is additionally multiplexed with signal light of the main signal by the multiplexing unit, when no abnormality is found in the second dummy light source and an abnormality of the first dummy light source is detected by the detection unit.

(Supplementary Note 2)

The optical transmission apparatus according to Supplementary note 1, wherein the first dummy light source outputs dummy light of the odd channel, the second dummy light source outputs dummy light of the even channel, the multiplexing unit multiplexes signal light of the main signal, dummy light input from the first dummy light source, and dummy light input from the second dummy light source, the detection unit detects an abnormality of the first dummy light source and an abnormality of the second dummy light source by detecting an abnormality of dummy light of the odd channel and an abnormality of dummy light of the even channel, respectively, and, as the addition control, the control unit controls the first dummy light source in such a way as to additionally output dummy light of the even channel, when no abnormality is found in the first dummy light source and an abnormality of the second dummy light source is detected by the detection unit, and controls the second dummy light source in such a way as to additionally output dummy light of the odd channel, when no abnormality is found in the second dummy light source and an abnormality of the first dummy light source is detected by the detection unit.

(Supplementary Note 3)

The optical transmission apparatus according to Supplementary note 1, wherein the multiplexing unit includes a selection unit configured to select, as dummy light to be multiplexed with signal light of the main signal, dummy light of the odd channel from dummy light input from the first dummy light source, and dummy light of the even channel from dummy light input from the second dummy light source, the detection unit detects an abnormality of the first dummy light source and an abnormality of the second dummy light source by detecting an abnormality of dummy light input from the first dummy light source and an abnormality of dummy light input from the second dummy light source, respectively, and, as the addition control, the control unit controls the selection unit in such a way as to additionally select dummy light of the even channel from dummy light input from the first dummy light source, when no abnormality is found in the first dummy light source and an abnormality of the second dummy light source is detected by the detection unit, and controls the selection unit in such a way as to additionally select dummy light of the odd channel from dummy light input from the second dummy light source, when no abnormality is found in the second dummy light source and an abnormality of the first dummy light source is detected by the detection unit.

(Supplementary Note 4)

The optical transmission apparatus according to any one of Supplementary notes 1 to 3, wherein
the control unit performs return control for making a return to a state before execution of the addition control, when either one of the first dummy light source and the second dummy light source being detected to have an abnormality is replaced after the addition control.

(Supplementary Note 5)

The optical transmission apparatus according to any one of Supplementary notes 1 to 4, wherein
the odd channel and the even channel each is an odd-numbered channel and an even-numbered channel, respectively, in a group of channels arranged in sequence in accordance with a relationship in value of a wavelength or a frequency.

(Supplementary Note 6)

The optical transmission apparatus according to any one of Supplementary notes 1 to 4, wherein the odd channel is a channel having a predetermined digit number of a center wavelength or a center frequency that takes an odd value, and the even channel is a channel having the predetermined digit number that takes an even value.

(Supplementary Note 7)

The optical transmission apparatus according to any one of Supplementary notes 1 to 6, wherein
the addition control includes control for performing adjustment in such a way as to compensate for an optical output power generated by dummy light of a channel being detected to have an abnormality by an optical output power of dummy light of a channel added to signal light of the main signal.

(Supplementary Note 8)

An optical transmission method comprising:

multiplexing signal light of a main signal, dummy light of an odd channel emitted using a first dummy light source as a light source, and dummy light of an even channel emitted using a second dummy light source as a light source;

detecting an abnormality of the first dummy light source and an abnormality of the second dummy light source; and performing addition control in such a way that dummy light of an even channel emitted using the first dummy light source as a light source is additionally multiplexed with signal light of the main signal in the multiplexing, when no abnormality is found in the first dummy light source and an abnormality of the second dummy light source is detected in the detecting, and dummy light of an odd channel emitted using the second dummy light source as a light source is additionally multiplexed with signal light of the main signal in the multiplexing, when no abnormality is found in the second dummy light source and an abnormality of the first dummy light source is detected in the detecting.

(Supplementary Note 9)

The optical transmission method according to Supplementary note 8, further comprising performing return control for making a return to a state before execution of the addition control, when either one of the first dummy light source and the second dummy light source being detected to have an abnormality is replaced after the addition control.

(Supplementary Note 10)

The optical transmission method according to Supplementary note 8 or 9, wherein the odd channel and the even channel each is an odd-numbered channel and an even-numbered channel, respectively, in a group of channels arranged in sequence in accordance with a relationship in value of a wavelength or a frequency.

(Supplementary Note 11)

The optical transmission method according to Supplementary note 8 or 9, wherein the odd channel is a channel having a predetermined digit number of a center wavelength or a center frequency that takes an odd value, and the even channel is a channel having the predetermined digit number that takes an even value.

(Supplementary Note 12) The optical transmission method according to any one of Supplementary notes 8 to 11, wherein
the addition control includes control for performing adjustment in such a way as to compensate for an optical output power generated by dummy light of a channel being detected to have an abnormality by an optical output power of dummy light of a channel added to signal light of the main signal.

(Supplementary Note 13)

A program for causing a computer, mounted in an optical transmission apparatus configured to multiplex signal light of a main signal, dummy light of an odd channel emitted using a first dummy light source as a light source, and dummy light of an even channel emitted using a second dummy light source as a light source, to execute:

detecting an abnormality of the first dummy light source and an abnormality of the second dummy light source; and performing addition control in such a way that dummy light of an even channel emitted using the first dummy light source as a light source is additionally multiplexed with signal light of the main signal, when no abnormality is found in the first dummy light source and an abnormality of the second dummy light source is detected in the detecting, and dummy light of an odd channel emitted using the second dummy light source as a light source is additionally multiplexed with signal light of the main signal, when no abnormality is found in the second dummy light source and an abnormality of the first dummy light source is detected in the detecting.

(Supplementary Note 14)

The program according to Supplementary note 13, further comprising performing return control for making a return to a state before execution of the addition control, when either one of the first dummy light source and the second dummy light source being detected to have an abnormality is replaced after the addition control.

(Supplementary Note 15)

The program according to Supplementary note 13 or 14, wherein the odd channel and the even channel each is an odd-numbered channel and an even-numbered channel, respectively, in a group of channels arranged in sequence in accordance with a relationship in value of a wavelength or a frequency.

(Supplementary Note 16)

The program according to Supplementary note 13 or 14, wherein the odd channel is a channel having a predetermined digit number of a center wavelength or a center frequency that takes an odd value, and the even channel is a channel having the predetermined digit number that takes an even value.

(Supplementary Note 17)

The program according to any one of Supplementary notes 13 to 16, wherein the addition control includes control for performing adjustment in such a way as to compensate for an optical output power generated by dummy light of a channel being detected to have an abnormality by an optical output power of dummy light of a channel added to signal light of the main signal.

What is claimed is:

1. An optical transmission apparatus comprising:
a multiplexer configured to multiplex signal light of a main signal, dummy light of an odd channel using a first dummy light source, and dummy light of an even channel using a second dummy light source;
a detector configured to detect an abnormality of the first dummy light source and an abnormality of the second dummy light source;
at least one memory; and
at least one processor coupled to the at least one memory and configured to perform operations comprising:
a first control operation in which, initially, at least one of the dummy light of the odd channel using the first dummy light source and the second dummy light of the even channel using the second dummy light source are multiplexed with the signal light of the main signal by the multiplexer, a second control operation in which, if the abnormality of the first dummy light source is not detected by the detector and the abnormality of the second dummy light source is detected by the detector, then dummy light of the even channel using the first dummy light source is additionally multiplexed with the signal light of the main signal by the multiplexer, and a third control operation in which, if the abnormality of the second dummy light source is not detected by the detector and the abnormality of the first dummy light source is detected by the detector, then dummy light of the odd channel emitted using the second dummy light source is additionally multiplexed with the signal light of the main signal by the multiplexer.

2. The optical transmission apparatus according to claim 1, wherein:

the first dummy light source is configured to output dummy light of the odd channel, the second dummy light source is configured to output dummy light of the even channel, the multiplexer is configured to multiplex the signal light of the main signal, the dummy light input from the first dummy light source, and the dummy light input from the second dummy light source, the detector is configured to detect the abnormality of the first dummy light source and the abnormality of the second dummy light source by detecting an abnormality of the dummy light of the odd channel and an abnormality of the dummy light of the even channel, respectively, and, the at least one processor is configured to:
if the abnormality of the first dummy light source is not detected by the detector and the abnormality of the second dummy light source is detected by the detector, then control, as the second control operation, the first dummy light source to additionally output the dummy light of the even channel, and
if the abnormality of the second dummy light source is not detected by the detector and the abnormality of the first dummy light source is detected by the detector, then control, as the third control operation, the second dummy light source to additionally output the dummy light of the odd channel.

3. The optical transmission apparatus according to claim 1, wherein:

the multiplexer includes a selector configured to select, as dummy light to be multiplexed with the signal light of the main signal, the dummy light of the odd channel from dummy light input from the first dummy light source, and the dummy light of the even channel from dummy light input from the second dummy light source, the detector is configured to detect the abnormality of the first dummy light source and the abnormality of the second dummy light source by detecting an abnormality of the dummy light input from the first dummy light source and an abnormality of the dummy light input from the second dummy light source, respectively, and, the at least one processor is configured to:
if the abnormality of the first dummy light source is not detected by the detector and the abnormality of the second dummy light source is detected by the detector, then control, as the second control operation, the selector to additionally select the dummy light of the even channel from the dummy light input from the first dummy light source, and if the abnormality of the second dummy light source is not detected by the detector and the abnormality of the first dummy light source is detected by the detector, then control, as the third control operation, the selector to additionally select the dummy light of the odd channel from the dummy light input from the second dummy light source.

4. The optical transmission apparatus according to claim 1, wherein:
the at least one processor is configured to perform a return control operation for making a return to a state before execution of the second control operation, if the second dummy light source is replaced after the second control operation, and for making a return to a state before execution of the third control operation if the first dummy light source is replaced after the third control operation.

5. The optical transmission apparatus according to claim 1, wherein the odd channel and the even channel each is an odd-numbered channel and an even-numbered channel, respectively, in a group of channels arranged in sequence in accordance with a relationship in value of a wavelength or a frequency.

6. The optical transmission apparatus according to claim 1, wherein:
the odd channel is a channel having a predetermined digit number of a center wavelength or a center frequency that takes an odd value, and
the even channel is a channel having the predetermined digit number that takes an even value.

7. The optical transmission apparatus according to claim 1, wherein:
the second control operation includes performing adjustment to compensate for an optical output power generated by the dummy light of the even a channel using the second dummy light source by an optical output power of the dummy light of the even channel using the first dummy light source, and
the third control operation includes performing adjustment to compensate for an optical output power generated by the dummy light of the odd channel using the first dummy light source by an optical output power of the dummy light of the odd channel using the second dummy light source.

8. An optical transmission method comprising:
multiplexing signal light of a main signal, dummy light of an odd channel using a first dummy light source, and dummy light of an even channel using a second dummy light source;
detecting an abnormality of the first dummy light source and an abnormality of the second dummy light source;
performing a first control operation in which, initially, at least one of the dummy light of the odd channel using the first dummy light source and the dummy light of the even channel using the second dummy light source are multiplexed with the signal light of the main signal by the multiplexer;
performing a second control operation comprising, if the abnormality of the first dummy light source is not detected in the detecting and the abnormality of the second dummy light source is detected in the detecting, then controlling dummy light of the even channel using the first dummy light source is additionally multiplexed with the signal light of the main signal in the multiplexing; and
performing a third control operation comprising, if the abnormality of the second dummy light source is not detected in the detecting and the abnormality of the first dummy light source is detected in the detecting, then controlling dummy light of the odd channel using the second dummy light source is additionally multiplexed with the signal light of the main signal in the multiplexing.

9. The optical transmission method according to claim 8, further comprising:
performing a return control operation for making a return to a state before execution of the second control operation, if the second dummy light source is replaced after the second control operation, and for making a return to a state before execution of the third control operation if the first dummy light source is replaced after the third control operation.

10. The optical transmission method according to claim 8, wherein the odd channel and the even channel each is an odd-numbered channel and an even-numbered channel, respectively, in a group of channels arranged in sequence in accordance with a relationship in value of a wavelength or a frequency.

11. The optical transmission method according to claim 8, wherein:
the odd channel is a channel having a predetermined digit number of a center wavelength or a center frequency that takes an odd value, and
the even channel is a channel having the predetermined digit number that takes an even value.

12. The optical transmission method according to claim 8, wherein:
the second control operation includes performing adjustment to compensate for an optical output power generated by the dummy light of the even channel using the second dummy light source by an optical output power of the dummy light of the even channel using the first dummy light source, and
the third control operation includes performing adjustment to compensate for an optical output power generated by the dummy light of the odd channel using the first dummy light source by an optical output power of the dummy light of the odd channel using the second dummy light source.

13. A non-transitory computer-readable medium storing a program for causing a computer, mounted in an optical transmission apparatus configured to multiplex signal light of a main signal, dummy light of an odd channel using a first dummy light source, and dummy light of an even channel using a second dummy light source, to execute operations comprising:
detecting an abnormality of the first dummy light source and an abnormality of the second dummy light source;
performing a first control operation in which, initially, at least one of the dummy light of the odd channel using the first dummy light source and the dummy light of the even channel using the second dummy light source are multiplexed with the signal light of the main signal;
performing a second control operation comprising, if the abnormality of the first dummy light source is not detected in the detecting and the abnormality of the second dummy light source is detected in the detecting, then controlling dummy light of the even channel using the first dummy light source is additionally multiplexed with the signal light of the main signal; and
performing a third control operation comprising, if the abnormality of the second dummy light source is not detected in the detecting and the abnormality of the first dummy light source is detected in the detecting, then controlling dummy light of the odd channel using the second dummy light source is additionally multiplexed with the signal light of the main signal.

14. The non-transitory computer-readable medium according to claim 13, wherein the operations further comprise:

performing a return control operation for making a return to a state before execution of the second control operation, if the second dummy light source is replaced after the second control operation, and for making a return to a state before execution of the third control operation if the first dummy light source is replaced after the third control operation.

15. The non-transitory computer-readable medium according to claim 13, wherein the odd channel and the even channel each is an odd-numbered channel and an even-numbered channel, respectively, in a group of channels arranged in sequence in accordance with a relationship in value of a wavelength or a frequency.

16. The non-transitory computer-readable medium according to claim 13, wherein:

the odd channel is a channel having a predetermined digit number of a center wavelength or a center frequency that takes an odd value, and the even channel is a channel having the predetermined digit number that takes an even value.

17. The non-transitory computer-readable medium according to claim 13, wherein:

the second control operation includes performing adjustment to compensate for an optical output power generated by the dummy light of the even channel using the second dummy light source by an optical output power of the dummy light of the even channel using the first dummy light source, and the third control operation includes control for performing adjustment to compensate for an optical output power generated by the dummy light of the odd channel using the first dummy light source by an optical output power of the dummy light of the odd channel using the second dummy light source.

* * * * *